(12) United States Patent
Yano

(10) Patent No.: US 11,973,918 B2
(45) Date of Patent: Apr. 30, 2024

(54) APPARATUS, METHOD, AND NON-TRANSITORY RECORDING MEDIUM

(71) Applicant: CANON KABUSHIKI KAISHA, Tokyo (JP)

(72) Inventor: Takaaki Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/549,513

(22) Filed: Dec. 13, 2021

(65) Prior Publication Data
US 2022/0201158 A1    Jun. 23, 2022

(30) Foreign Application Priority Data

Dec. 23, 2020   (JP) ................................. 2020-213833

(51) Int. Cl.
*H04N 1/60*    (2006.01)

(52) U.S. Cl.
CPC ........... *H04N 1/605* (2013.01); *H04N 1/6058* (2013.01); *H04N 1/6072* (2013.01)

(58) Field of Classification Search
CPC .... H04N 1/605; H04N 1/6058; H04N 1/6072; H04N 1/6036; G03G 15/5062
See application file for complete search history.

(56) References Cited

U.S. PATENT DOCUMENTS

| 7,486,414 | B2 * | 2/2009 | Arai ................. G11B 20/10009 358/1.9 |
| 2003/0164955 | A1 * | 9/2003 | Vinas ..................... B41J 11/008 358/1.18 |
| 2011/0182598 | A1 * | 7/2011 | Watanabe .......... G03G 15/5058 399/39 |
| 2014/0016149 | A1 * | 1/2014 | Matsuzaki ........... H04N 1/6019 358/1.9 |
| 2014/0139883 | A1 * | 5/2014 | Hashizume .......... H04N 1/6038 358/3.06 |
| 2014/0176970 | A1 * | 6/2014 | Iguchi .................. H04N 1/6033 358/1.9 |
| 2015/0363677 | A1 * | 12/2015 | Nihei ................. G03G 15/0189 358/1.12 |
| 2016/0147175 | A1 * | 5/2016 | Ohkubo ............. G03G 15/0189 399/301 |
| 2016/0156810 | A1 * | 6/2016 | Nakamura .......... H04N 1/00015 358/1.9 |
| 2016/0231686 | A1 * | 8/2016 | Itoh ...................... G03G 15/502 |
| 2017/0076182 | A1 * | 3/2017 | Matsuzaki ......... G06K 15/1878 |
| 2017/0197448 | A1 * | 7/2017 | Velner .................. H04N 1/6036 |

(Continued)

FOREIGN PATENT DOCUMENTS

| JP | 2003262999 A | * | 9/2003 |
| JP | 2008022304 A | * | 1/2008 |

(Continued)

*Primary Examiner* — Ted W Barnes
(74) *Attorney, Agent, or Firm* — CANON U.S.A., INC. IP Division

(57) ABSTRACT

A gradation pattern image is determined in accordance with an image formation mode acquired when printing of a predetermined number of pages has been performed. A color gradation pattern image is formed when a color image formation mode has been acquired, whereas a monochrome gradation pattern image is formed when a monochrome image formation mode has been acquired.

14 Claims, 19 Drawing Sheets

(56) References Cited

U.S. PATENT DOCUMENTS

| | | | |
|---|---|---|---|
| 2019/0064721 A1* | 2/2019 | Yamanaka | G03G 15/105 |
| 2019/0086833 A1* | 3/2019 | Yamada | G03G 15/5008 |
| 2020/0372311 A1* | 11/2020 | Luttmer | G06K 15/1878 |
| 2021/0203810 A1* | 7/2021 | Kasahara | H04N 1/6033 |
| 2021/0409574 A1* | 12/2021 | Oba | H04N 1/6027 |
| 2022/0124222 A1* | 4/2022 | Kasahara | G03G 15/5025 |
| 2022/0128940 A1* | 4/2022 | Tanaka | G03G 15/5029 |
| 2022/0141355 A1* | 5/2022 | Tsujita | H04N 1/6044 |
| | | | 358/1.9 |

FOREIGN PATENT DOCUMENTS

| | | | | | |
|---|---|---|---|---|---|
| JP | 2010122377 | A | * | 6/2010 | |
| JP | 2010122377 | A | | 6/2010 | |
| JP | 4721115 | B2 | * | 7/2011 | |
| JP | 5123334 | B2 | * | 1/2013 | G03G 15/0131 |
| JP | 2022069963 | A | * | 5/2022 | G03G 15/5029 |

* cited by examiner

FIG. 13A

| REFERENCE VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

FIG. 13B

| MEASURED VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

FIG. 13C

| CORRECTION VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 4 | 1 | -3 | -2 | -3 | -8 | 4 | 0 | 2 | 2 |
| M | 10 | 3 | 5 | -6 | 0 | -10 | -10 | -2 | -4 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

# APPARATUS, METHOD, AND NON-TRANSITORY RECORDING MEDIUM

BACKGROUND

Field of the Disclosure

The aspect of the embodiments relates to an apparatus, a method, and a non-transitory recording medium.

Description of the Related Art

An existing image forming apparatus has a plurality of print modes that enable an image formation mode to be switched between color printing and monochrome printing. For example, when printing of a certain number of successive monochrome image pages occurs, a forming unit of the image forming apparatus is switched to a monochrome image formation mode in which printing with only a black toner can be performed. Control of toners other than the black toner and a member including a photoconductive drum is suspended. As a result of switching the print mode, mechanical degradation is expected to be suppressed with productivity being increased. On the other hand, switching of the print mode involves change of the forming unit and thus takes a long time.

There is a printing system in which an inline sensor is connected to a subsequent stage of an image forming apparatus that forms an image on a sheet and the inline sensor reads the image on the sheet formed by the image forming apparatus.

In such a printing system, the inline sensor reads a density adjustment patch printed on a sheet by the image forming apparatus, and accordingly an adjustment result can be fed back to a printer in real time even during printing of a job including a large number of pages. It may be desirable to print the patch on a margin of an output material (sheet), but it may be impossible to print the adjustment patch depending on the type or size of sheet.

Japanese Patent Laid-Open No. 2010-122377 discloses a technique of generating an adjustment chart by printing patches on a sheet different from an output material of a print job and printing and inserting the adjustment chart when the number of printed pages has reached a predetermined number during printing of the job. Japanese Patent Laid-Open No. 2010-122377 also discloses a technique of reading the densities of the patches of the printed adjustment chart and feeding back the result to an apparatus to perform density adjustment.

In Japanese Patent Laid-Open No. 2010-122377, an adjustment chart constituted by four colors of cyan, magenta, yellow, and black is constantly printed regardless of the print mode at the time of insertion of the adjustment chart, and a gradation correction table of the four colors is updated. In a monochrome image formation mode, only a black toner is used for printing, and thus the updated gradation correction table is used only for black. The toners of the other colors are not used until a next color image page is printed, even if the gradation correction table is updated. Thus, constantly forming and reading patches of all the colors to perform gradation correction results in unnecessary use of chromatic color toners.

SUMMARY OF THE DISCLOSURE

An apparatus switches between a color image formation mode in which printing is performed using a plurality of recording materials including a chromatic color recording material and a monochrome image formation mode in which printing is performed using a black single color recording material without using the chromatic color recording material. The apparatus includes a forming unit configured to form a gradation pattern image on a sheet fed from a sheet feeding stage in response to printing of a predetermined number of pages of images having been performed, a measuring unit configured to read the formed gradation pattern image and measure a color of the gradation pattern image, a generating unit configured to generate gradation correction data, based on a color measurement result of the measuring unit and a reference value, and a correcting unit configured to perform gradation correction on image data by using the generated gradation correction data. The formed gradation pattern image is determined in accordance with an image formation mode of the apparatus acquired when the printing of the predetermined number of pages has been performed.

An apparatus includes a forming unit configured to form a gradation pattern image on a sheet fed from a sheet feeding stage in response to printing of a predetermined number of pages of images having been performed, a measuring unit configured to read the formed gradation pattern image and measure a color of the gradation pattern image, a generating unit configured to generate gradation correction data, based on a color measurement result of the measuring unit and a reference value, and a correcting unit configured to perform gradation correction on image data by using the generated gradation correction data. The formed gradation pattern image is determined in accordance with an acquired color attribute of an image on a page of the predetermined number.

Further features of the disclosure will become apparent from the following description of exemplary embodiments with reference to the attached drawings.

BRIEF DESCRIPTION OF THE DRAWINGS

FIG. 13A is a diagram illustrating an example of reference value data, FIG. 13B is a diagram illustrating an example of measured value data, and FIG. 13C is a diagram illustrating an example of correction value data.

DESCRIPTION OF THE EMBODIMENTS

Hereinafter, embodiments of the disclosure will be described with reference to the drawings.

First Embodiment

Configuration of Printing System

Figure 1:
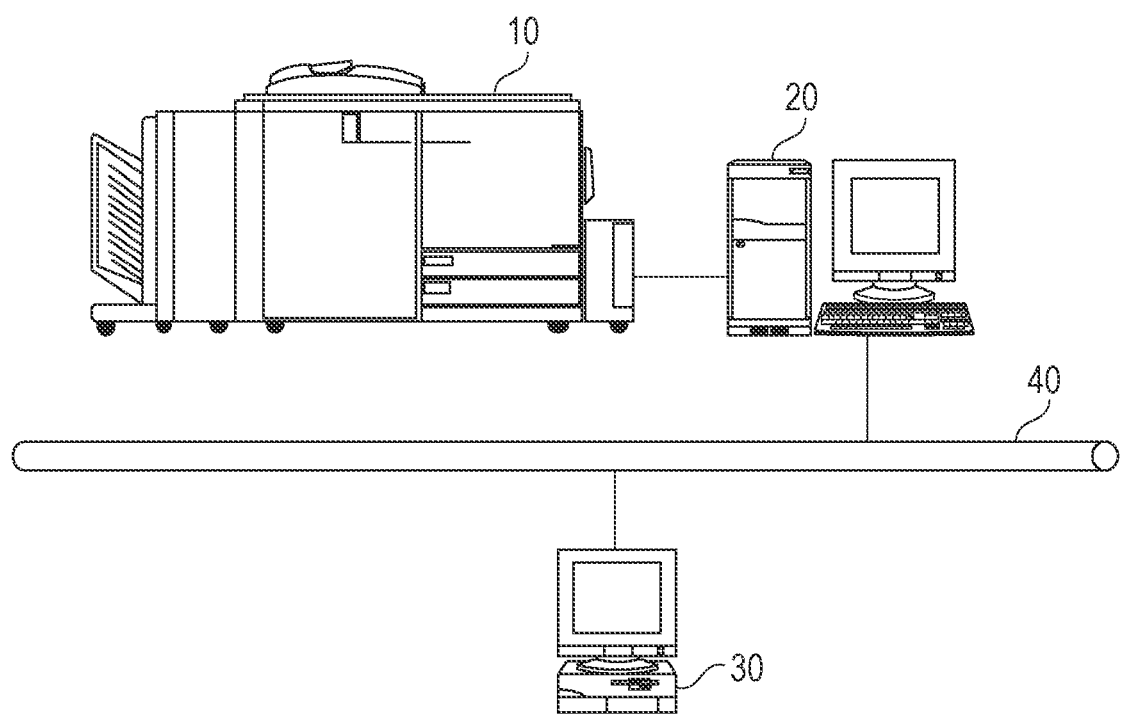
FIG. 1 is a diagram illustrating an example of a configuration of a printing system according to a first embodiment.

FIG. 1 is a diagram illustrating an example of a configuration of a printing system according to the present embodiment. As illustrated in FIG. 1, in the printing system, an image processing apparatus 20 connected to an image forming apparatus 10, and a client personal computer (PC) 30, are connected to each other through a network 40 such as a local area network (LAN). The image forming apparatus 10 and the image processing apparatus 20 have a function of forming an image on a recording medium, such as a paper or plastic sheet (hereinafter referred to as a "sheet"), in response to a print request received from the client PC 30 (printing function).

The configuration of the printing system is not limited to that illustrated in FIG. 1. It is sufficient that at least one client PC 30 be connected to the image forming apparatus 10 and the image processing apparatus 20 through the network 40 such that the apparatuses are capable of communicating with each other. The image processing apparatus 20 may be configured as a print server independent of the image forming apparatus 10, as illustrated in FIG. 1, or the image forming apparatus 10 may have the function of the image processing apparatus 20 to serve as an integrated system. The network 40 may either be wired or wireless.

Hardware Configuration of Printing System

Figure 18:
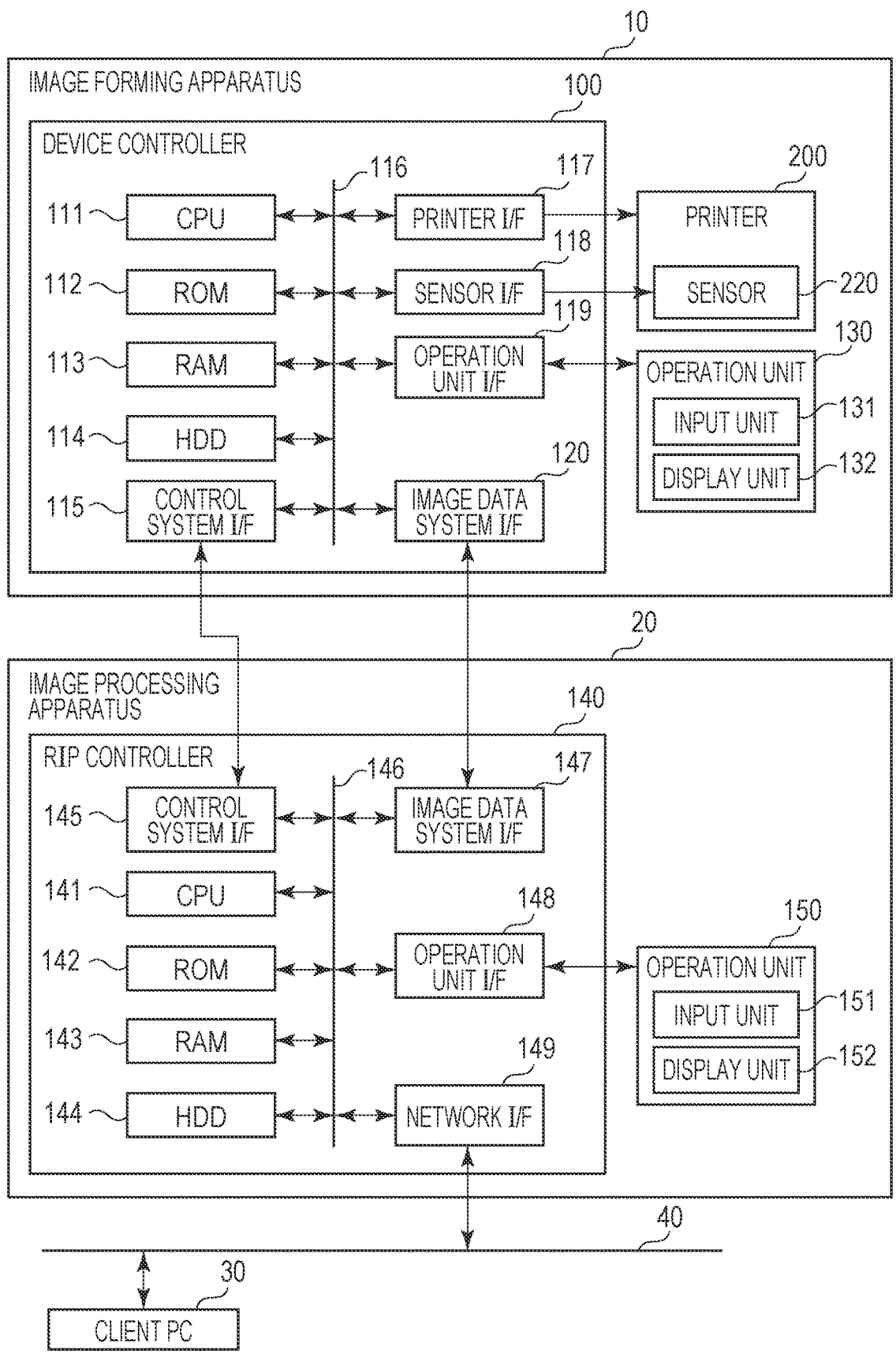
FIG. 18 is a block diagram illustrating an example of a hardware configuration of the printing system according to the first embodiment.

FIG. 18 is a block diagram illustrating a hardware configuration of the printing system according to the present embodiment.

In the image forming apparatus 10, a device controller 100 is a controller that controls devices of the image forming apparatus 10. A central processing unit (CPU) 111 centrally controls accesses to various devices connected to a system bus 116 in accordance with a control program stored in a read only memory (ROM) 112 or a hard disk drive (HDD) 114. The ROM 112 stores a control program or the like executable by the CPU 111. A random access memory (RAM) 113 functions mainly as a main memory, a work area, and the like of the CPU 111, and is configured to be capable of being expanded in memory capacity by an optional RAM connected to an expansion port which is not illustrated. The HDD 114 stores a boot program, various applications, font data, user files, edit files, and so forth. Although the HDD 114 is used in the present embodiment, an SD card or a flash memory may be used as an external storage device instead of the HDD 114. A control system interface (I/F) 115 transmits/receives information used for print control to/from the image processing apparatus 20. A printer I/F 117 controls image output to a printer 200. An operation unit I/F 119 controls display on a display unit 132 included in an operation unit 130 and controls input of various pieces of setting information set in an input unit 131 included in the operation unit 130. An image data system I/F 120 receives, from the image processing apparatus 20, image data to be transmitted to the printer 200. A sensor I/F 118 transmits an operation instruction for a sensor 220 included in the printer 200 and receives a measurement result of the sensor 220. The sensor 220 is disposed between a fixing unit and a sheet output port on a sheet conveyance path. Alternatively, the sensor 220 may be disposed on a sheet conveyance path of a finishing device connected to the subsequent stage of the printer 200 and not illustrated. A measurement chart including color patches disposed in accordance with the position of the sensor 220 is printed, and the chart passes the sensor 220. Accordingly, the sensor 220 measures patch information, such as a spectral value, a chromaticity value, and a density, for example. The information obtained through the measurement is used for adjustment functions of both the apparatuses.

In the image processing apparatus 20, a raster image processor (RIP) controller 140 performs processing for executing a printing process in the image processing apparatus 20, such as analysis of an input print job and development to image data. A CPU 141 centrally controls accesses to various devices connected to a system bus 146 in accordance with a control program stored in a ROM 142 or a HDD 144. The ROM 142 stores a control program or the like executable by the CPU 141. A RAM 143 functions mainly as a main memory, a work area, and the like of the CPU 141, and is configured to be capable of being expanded in memory capacity by an optional RAM connected to an expansion port which is not illustrated. The HDD 144 stores a boot program, various applications, font data, user files, edit files, and so forth. Although the HDD 144 is used in the present embodiment, an SD card or a flash memory may be used as an external storage device instead of the HDD 144. A control system I/F 145 transmits/receives information used for print control to/from the image forming apparatus 10. An image data system I/F 147 transmits, to the image forming apparatus 10, image data to be output from the printer 200.

An operation unit I/F 148 controls display on a display unit 152 included in an operation unit 150 and controls input of various pieces of setting information set in an input unit 151 included in the operation unit 150. A network I/F 149 performs data communication with the external network 40 through a network cable.

The image processing apparatus 20 may have a function of inputting a print job, similarly to the client PC 30 described below. A print job is input from the operation unit 150 to the RIP controller 140 via a printer driver or a print management application.

The client PC 30 is connected to the image processing apparatus 20 through the external network 40. The client PC 30 inputs a print job to the image processing apparatus 20 via a printer driver or a print management application.

Internal Structure of Printing System

Figure 2:
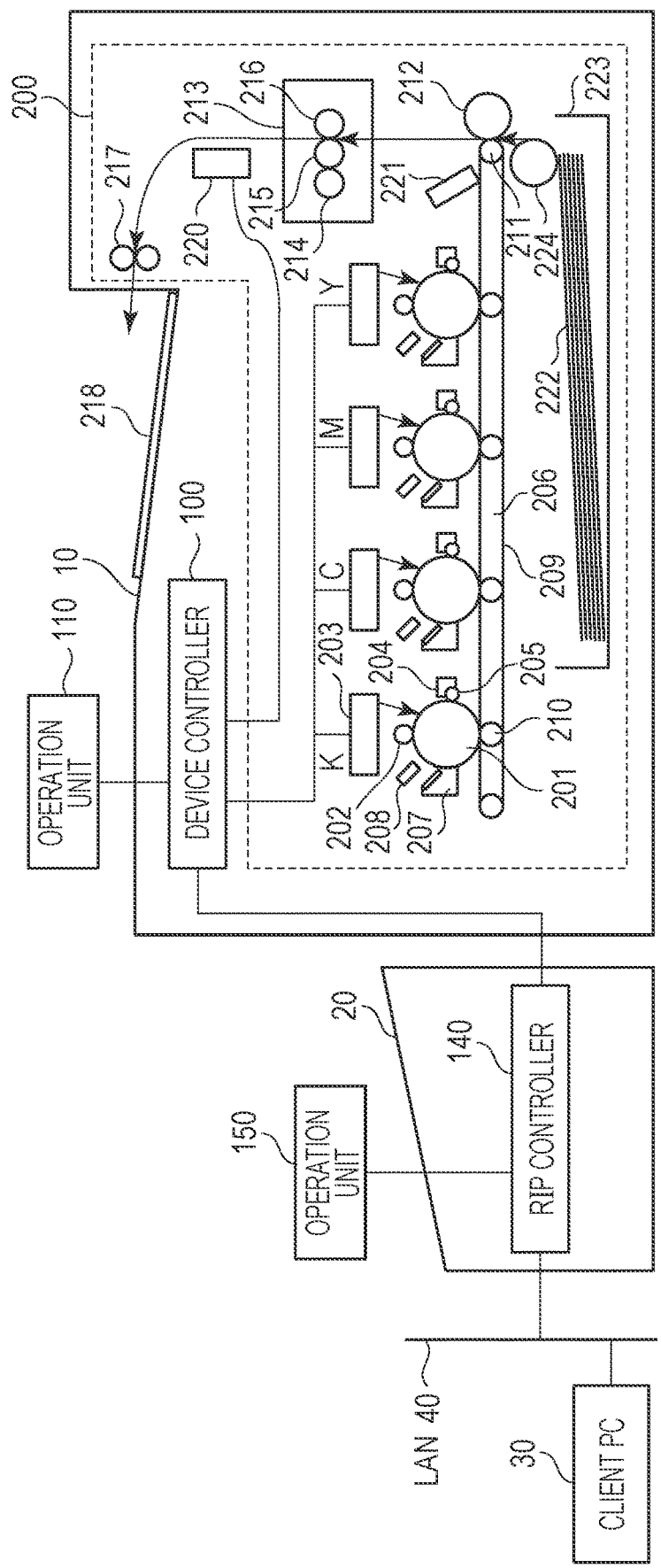
FIG. 2 is a diagram describing an internal structure of the printing system according to the first embodiment.

FIG. 2 is a diagram describing an internal structure of the printer 200 that is based on an electrophotographic method and equipped in the image forming apparatus 10 according to the present embodiment, and relationships among the individual apparatuses.

Referring to FIG. 2, the portion surrounded by a broken line is the printer 200. The printer 200 includes four stations corresponding to respective toners (recording materials) of cyan (C), magenta (M), yellow (Y), and black (K). The four stations are arranged in a horizontal direction and sequentially form toner images in the order of yellow, magenta, cyan, and black. The yellow toner, the magenta toner, and the cyan toner are chromatic color recording materials.

Each station includes a photoconductive drum 201 serving as an image bearing member. A charging device 202, an exposure device 203, a development device 204, a cleaning device 207, and a pre-exposure device 208 are disposed along a circumferential surface of the photoconductive drum 201. The development device 204 has a development roller 205 for supplying a developer (toner) to the photoconductive drum 201. In an intermediate transfer unit 206, a first transfer roller 210 faces and contacts the photoconductive drum 201 with an intermediate transfer belt 209 therebetween in each station. A second transfer inner roller 211 and a second transfer roller 212 contact each other with the intermediate transfer belt 209 therebetween, and are disposed such that the intermediate transfer belt 209 is rotated in a conveying direction. A fixing device 213 is constituted by a heating film (heating rotation body) 214, a fixing roller 215, and a pressing roller 216, and heats and pressurizes a toner transferred onto a sheet 222 to fix the toner. Discharge rollers 217 discharge the sheet 222 that has passed through the fixing device 213 onto a discharge tray 218.

The sensor 220, which is a color measurement sensor, is disposed between the fixing device 213 and the discharge rollers 217 so as to be capable of reading a print side, measures the density of a patch formed on the sheet 222 that has been subjected to fixing, and transmits color measurement data (density data) to the device controller 100. A cleaning blade 221 removes toner that is not transferred onto the sheet 222 at second transfer and remains on the intermediate transfer belt 209. A sheet feeding roller 224 feeds the sheet 222 stored in a sheet cassette 223 (sheet feeding stage). Although FIG. 2 illustrates a single sheet cassette 223, it is assumed that the printer 200 includes a plurality of sheet cassettes 223 for various sheet sizes and various sheet types.

Next, software configurations of the individual apparatuses according to the present embodiment will be described.

Software Configuration of Image Forming Apparatus

Figure 3A:
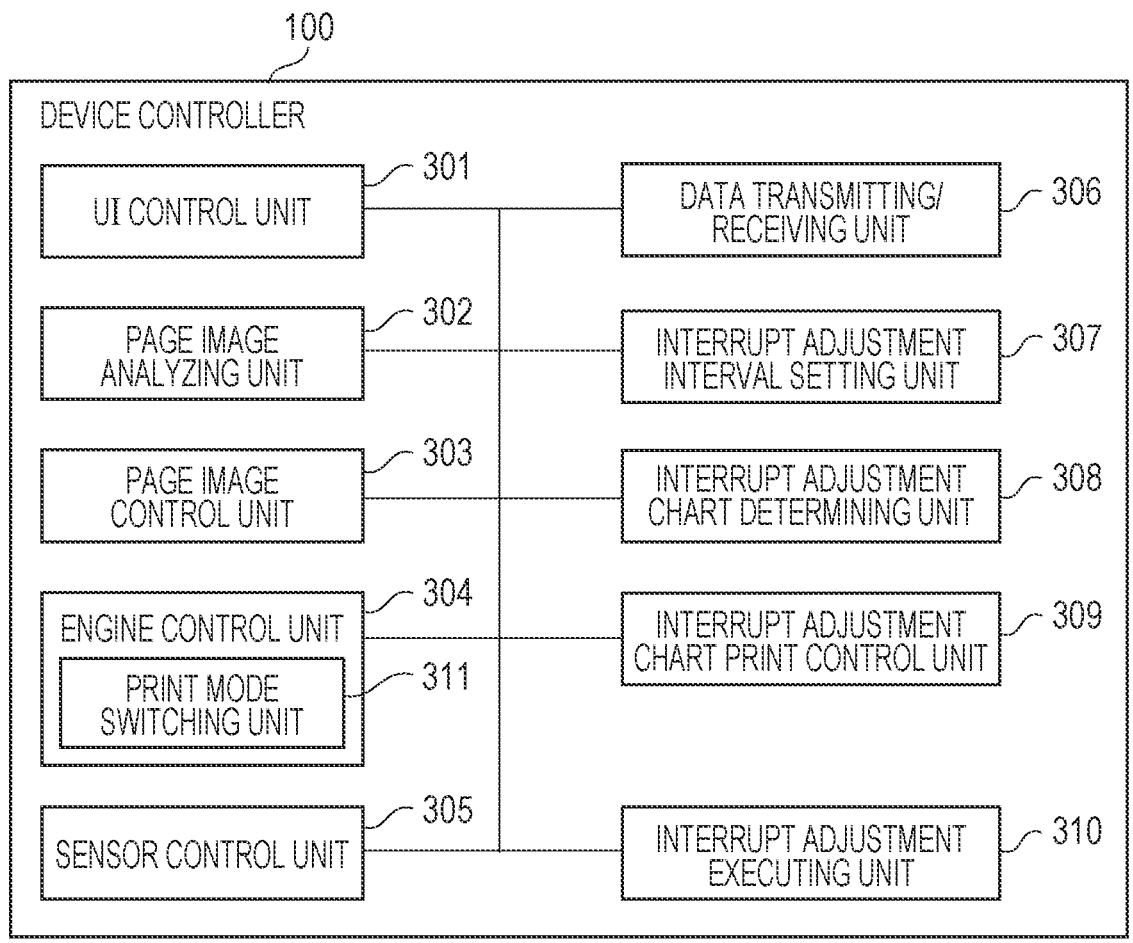
FIGS. 3A and 3B are block diagrams each illustrating an example of a software configuration of the printing system according to the first embodiment.

FIG. 3A is a block diagram of the device controller 100, illustrating a software module configuration of the image forming apparatus 10. These software modules are stored as a program in the HDD 114, and are loaded into the RAM 113 and executed by the CPU 111.

A user interface (UI) control unit 301 controls display on the display unit 132 in the operation unit 130 and controls input of various pieces of setting information set in the input unit 131, via the operation unit I/F 119.

A page image analyzing unit 302 analyzes a print job received from the image processing apparatus 20. In the present embodiment, the page image analyzing unit 302 determines whether an interrupt adjustment setting of the print job is enabled. A page image control unit 303 executes a printing process in the image forming apparatus 10 on the print job. The page image control unit 303 executes a density gradation correction process, application of a halftone process, or the like, thereby generating data that can be printed by the printer 200. An engine control unit 304 controls a series of printing operations performed by the printer 200. The print job is processed in units of pages and subjected to printing.

A sensor control unit 305 controls the sensor 220 to measure the density of a patch formed on a printed sheet of a page for which a sensor measurement instruction has been provided, and acquire color measurement data. A data transmitting/receiving unit 306 controls transmission/reception of data to/from the image processing apparatus 20. The data that is transmitted/received is, for example, data of a print job, setting registration information stored in the image forming apparatus 10, or the like. An interrupt adjustment interval setting unit 307 sets an interval of interrupt printing of an adjustment chart.

Figure 8:
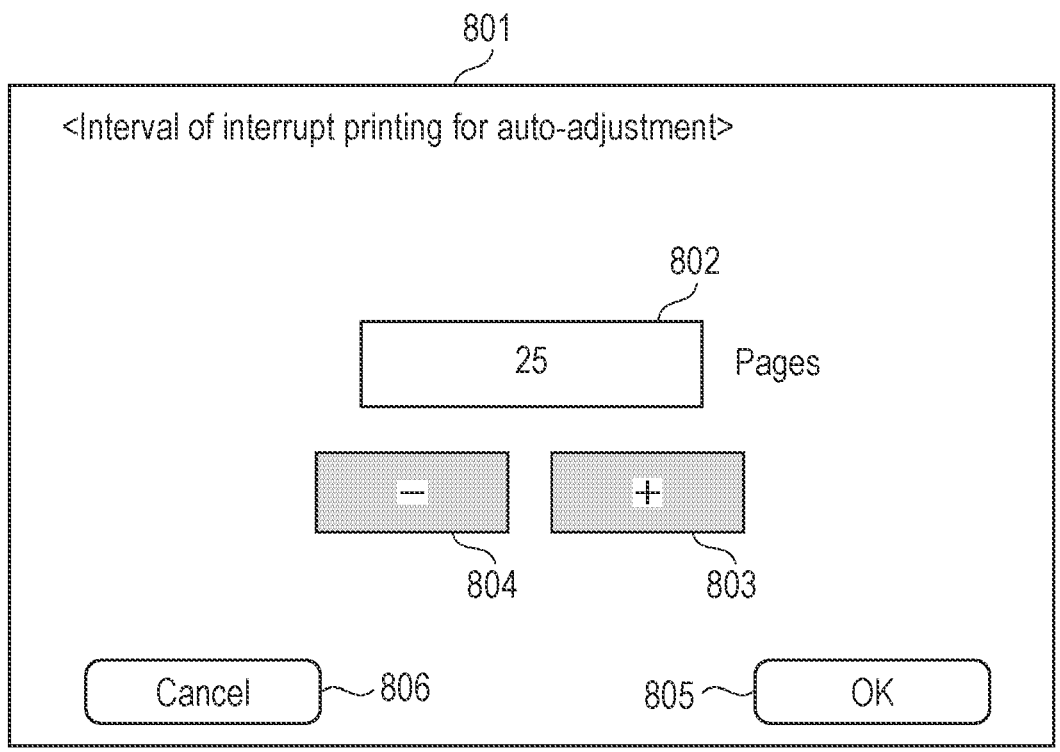
FIG. 8 is a diagram illustrating an example of a screen for setting an interrupt adjustment interval.

FIG. 8 illustrates an example of a UI screen for setting an interrupt adjustment interval according to the present embodiment. A UI screen 801 is generated by the interrupt adjustment interval setting unit 307 and is displayed on the display unit 132 via the UI control unit 301. A reference numeral 802 denotes interval information indicating an interval at which an adjustment chart for executing adjustment is to be printed. A setting is accepted from an operator via the input unit 131. Here, the number of pages to be printed is designated as interrupt interval information. On the UI screen 801, a change of setting is accepted in response to an operation of a button 803 or a button 804. Alternatively, for example, a UI that displays a numeric keypad and directly accepts a numerical value may be used. Upon pressing of an OK button 805 by the operator, the interrupt adjustment interval setting unit 307 transmits designated information to an interrupt adjustment executing unit 310 described below, and then closes the UI screen 801. Upon pressing of a cancel button 806, the interrupt adjustment interval setting unit 307 immediately closes the UI screen 801.

An interrupt adjustment chart determining unit 308 determines, based on information received from the page image analyzing unit 302 or the page image control unit 303, a patch layout configuration of an adjustment chart to be inserted. The details will be described below. An interrupt adjustment chart print control unit 309 performs control for executing interrupt printing. To print an adjustment chart at a designated interval, the interrupt adjustment chart print control unit 309 performs processing related to printing of an adjustment chart, such as counting and clearing of the number of printed pages, and generation of an adjustment chart image. The interrupt adjustment executing unit 310 acquires color measurement data (color measurement result) from the sensor 220 and calculates a correction value for correcting gradation. Gradation correction data is updated based on the correction value.

A print mode switching unit 311 is a part of the engine control unit 304 and controls mode switching of a printing operation performed by the printer 200. The timing to switch the print mode is as follows. For example, number-of-pages information indicating the number of pages at which monochrome page images are successively printed is defined in the engine control unit 304, and the print mode is switched from a color image formation mode to a monochrome image formation mode when the number of pages has reached the number.

If the print mode is the monochrome image formation mode at the time of printing a color page image, the print mode is immediately switched from the monochrome image formation mode to the color image formation mode.

Now, control of the print mode of the printer 200 will be described.

In the present embodiment, the printer 200 has, as print modes, a color image formation mode capable of both color printing and monochrome printing, and a monochrome image formation mode capable of only monochrome printing. The print mode switching unit 311 switches the print mode in the manner described below.

In the color image formation mode, image formation is performed such that all the photoconductive drums 201K, 201C, 201M, and 201Y of all of K, C, M, and Y are in contact with the intermediate transfer belt 209. All the photoconductive drums 201 are in a ready state of being capable of immediately executing image formation. In this print mode, color printing and monochrome printing can be performed, but all the photoconductive drums 201 are operated in a ready state even during monochrome printing.

In the monochrome image formation mode, image formation is performed such that the photoconductive drums 201C, 201M, and 201Y of C, M, and Y are separated from the intermediate transfer belt 209 and are stopped and that only the photoconductive drum 201K of K is in contact with the intermediate transfer belt 209. Only the photoconductive drum 201K of K is in a ready state of being capable of immediately executing image formation. In this print mode, monochrome printing can be performed, but it is impossible to perform color printing. If an instruction of color printing is provided during control of the monochrome image formation mode, the printer 200 is to switch the control so that all the photoconductive drums 201 come into contact with the intermediate transfer belt 209. The switching operation is performed after completion of image formation and transfer to sheets in all the pages progressing in parallel on the intermediate transfer belt 209. After the rotation of the individual photoconductive drums 201 has been restarted, the photoconductive drums 201 are brought into contact with the intermediate transfer belt 209. Thus, the switching operation takes a certain time. In the monochrome image formation mode, printing is performed using a recording material of only a black single color (K).

Here, a method in which the photoconductive drums 201 are separated from the intermediate belt 209 and are stopped has been described as control of the monochrome image formation mode. However, the control method is not limited thereto.

Another method may be used, for example, the first transfer rollers 210, in addition to the photoconductive drums 201, may be separated from the intermediate transfer belt 209 and stopped, or power supply to the exposure device 203 or the development device 204 may be stopped.

Software Configuration of Image Processing Apparatus

Figure 3B:
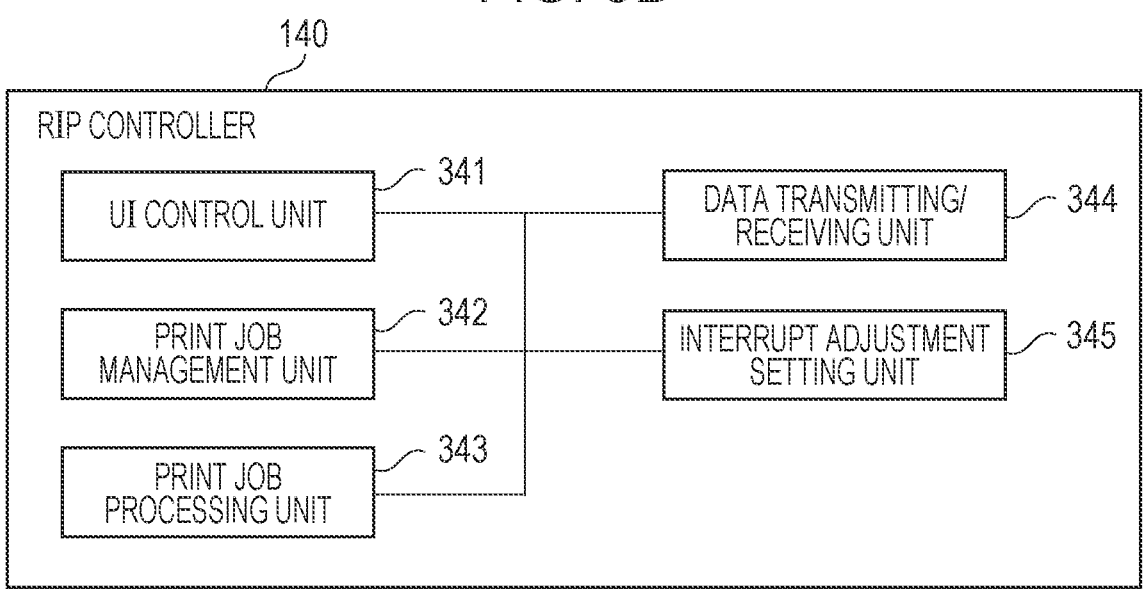

FIG. 3B is a block diagram of the RIP controller 140, illustrating a software module configuration of the image processing apparatus 20. These software modules are stored as a program in the HDD 144, and are loaded into the RAM 143 and executed by the CPU 141. A UI control unit 341 controls display on the display unit 152 in the operation unit 150 and controls input of various pieces of setting information set in the input unit 151 via the operation unit I/F 148.

A print job management unit 342 manages print job data accepted from an operator.

Specifically, the print job management unit 342 performs processing such as calling of a print job stored in the HDD 144, reflecting of a change in print job setting made by the operator, and history management of print jobs that have been completed. In general, there is a print management application for enabling the operator to easily execute a series of processes.

Figure 9:
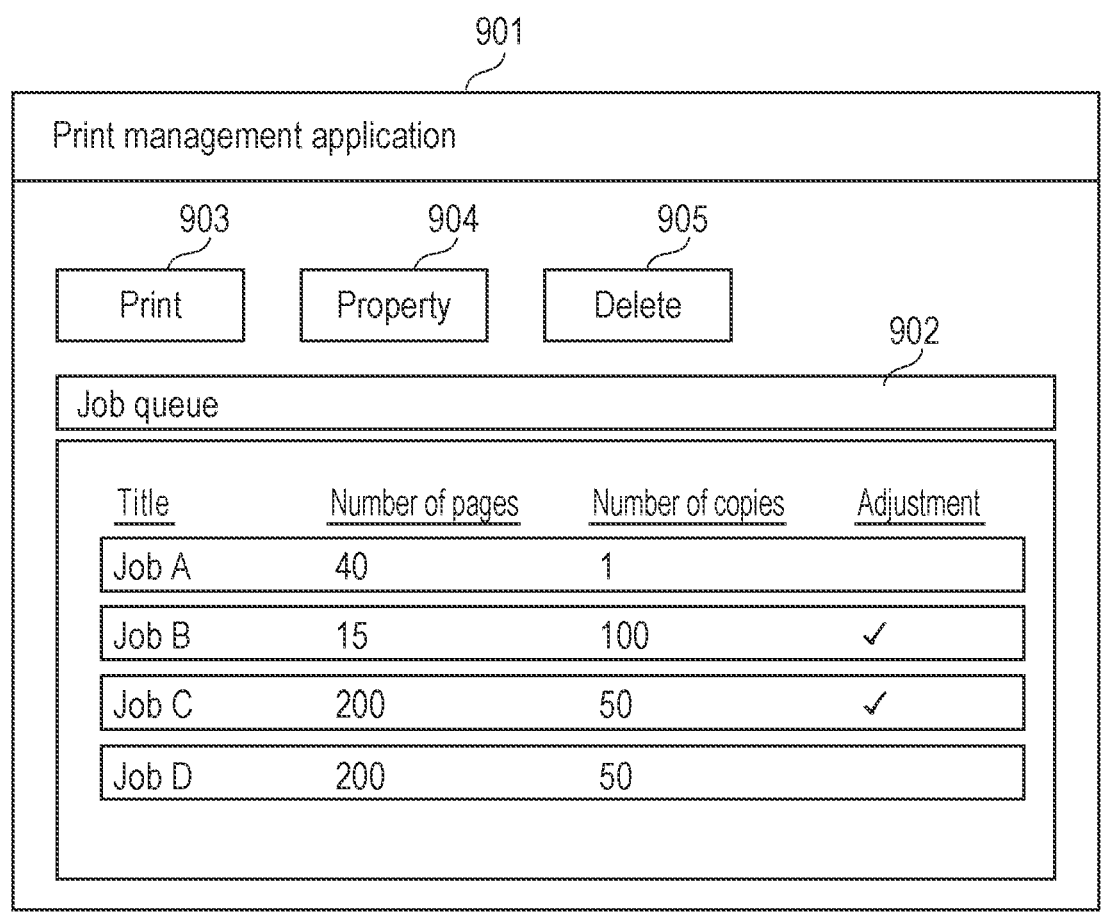
FIG. 9 is a diagram illustrating an example of a print management application screen.

FIG. 9 illustrates an example of a UI screen of a print management application according to the present embodiment. A UI screen 901 is managed and generated by the print job management unit 342 and is displayed on the display unit 152 via the UI control unit 341. A job queue 902 is a job queue displaying information on print jobs received by the image processing apparatus 20. The information displayed here includes information indicating the name, the number of pages, and the number of copies of a print job, information indicating whether interrupt adjustment described below is enabled, and information indicating whether the print job has been processed. The information to be displayed is not limited thereto. For example, any items set to the print job, such as color/monochrome information and sheet information, may be displayed.

Upon pressing of any one of buttons 903 to 905 with a target print job being selected by the operator, the print job management unit 342 executes a process in accordance with the pressed button. Upon pressing of the print button 903, the print job management unit 342 starts a printing process of the selected print job, and transmits print data to the image forming apparatus 10 after completing the process. Upon pressing of the property button 904, the print job management unit 342 displays a UI screen for performing print settings of the selected print job. The print settings include various items related to, for example, a sheet to be used for the print job, a page layout, a color, and image processing. The print job management unit 342 is notified of print setting items that are set here. Upon pressing of the delete button 905, the data of the selected print job is deleted from the queue.

Figure 10:
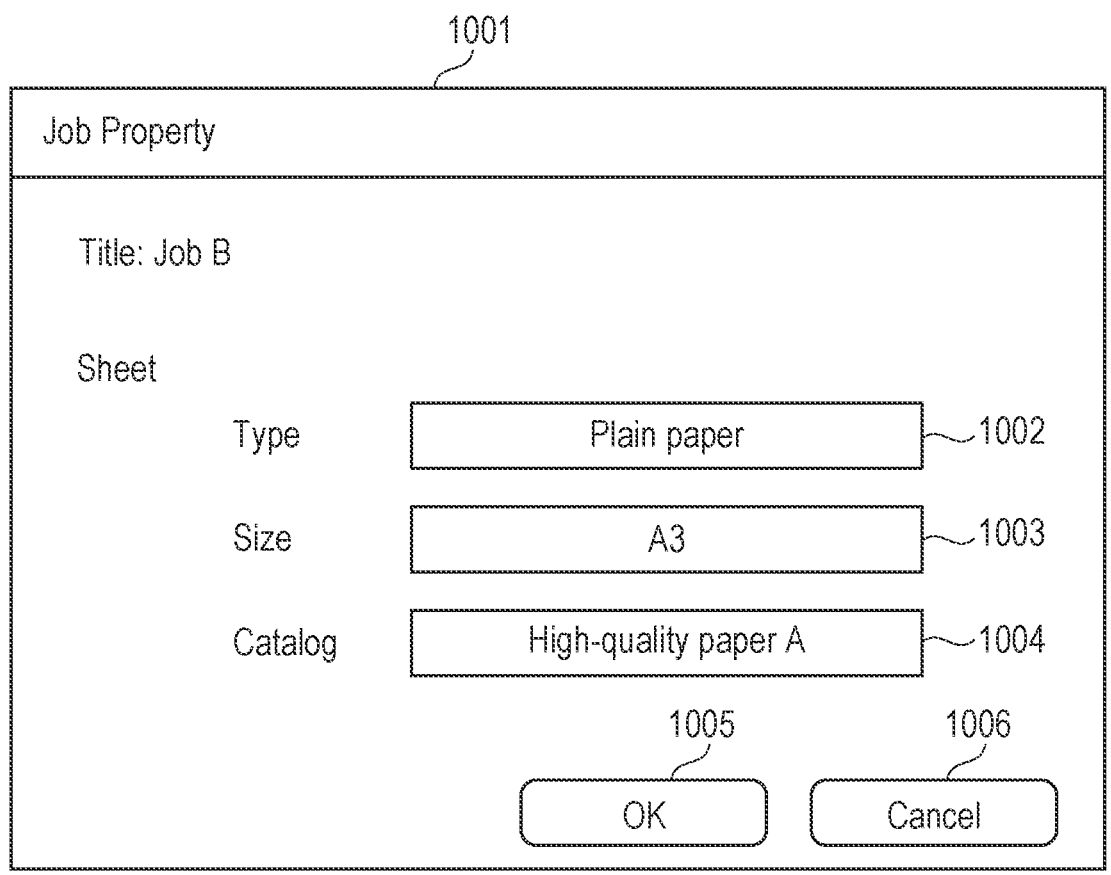
FIG. 10 is a diagram illustrating an example of a print job setting screen.

FIG. 10 illustrates an example of a UI screen for performing a setting related to a printing sheet, which is one of print settings for a print job. A UI screen 1001 is generated by the print job management unit 342 and is displayed on the display unit 152 via the UI control unit 341.

On this UI screen, a field 1002 indicates the type of sheet, a field 1003 indicates the size of sheet, and a field 1004 indicates information on a sheet catalog. These settings are received from the operator via the input unit 151. Here, the sheet catalog is a name for certain collective sheet information, which is managed by the print job management unit 342 but may be created by the operator. Upon a sheet catalog being selected in the field 1004, the field 1002 of the type of sheet and the field 1003 of the size indicate information set to the sheet catalog. Upon pressing of an OK button 1005, the print job management unit 342 sets the input sheet information as job setting information. Upon pressing of a cancel button 1006, the print job management unit 342 closes the UI screen 1001.

A print job processing unit 343 performs a process for executing a printing process, such as analysis, development to image data, and image compression/decompression of a print job accepted from the operator. A data transmitting/receiving unit 344 manages transmission/reception of various data to/from the image forming apparatus 10. Print job data generated by the print job processing unit 343 is transmitted to the image forming apparatus 10 by the data transmitting/receiving unit 344. The data transmitting/receiving unit 344 also manages transmission/reception of data to/from the client PC 30 connected via the external network 40. An interrupt adjustment setting unit 345 sets whether to perform interrupt adjustment on a print job. This setting is one of the print setting items displayed upon pressing of the property button 904 on the UI screen 901 of the print management application described above.

Figure 11:
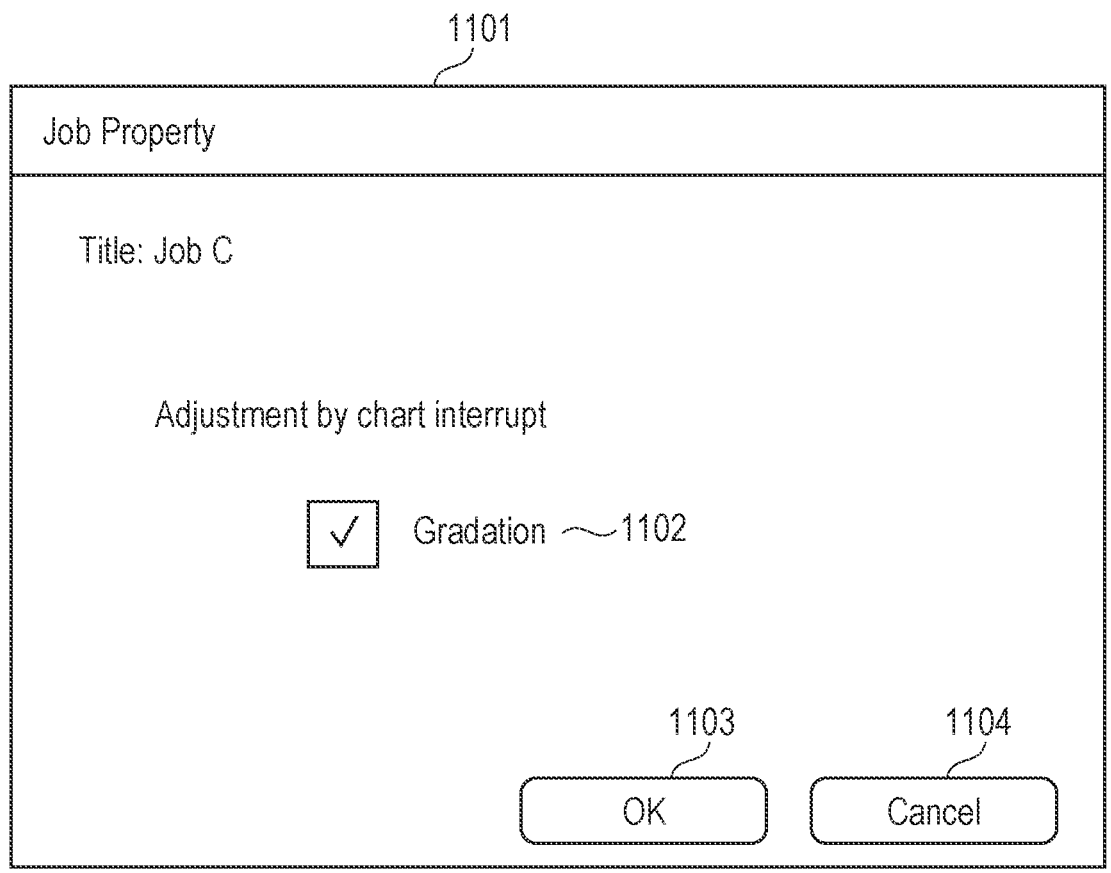
FIG. 11 is a diagram illustrating an example of a print job setting screen.

FIG. 11 illustrates an example of a UI screen for performing a print setting of a print job according to the present embodiment. A UI screen 1101 is managed and created by the interrupt adjustment setting unit 345 on the print job management unit 342 and is displayed on the display unit 152 via the UI control unit 341. A checkbox 1102 is used to designate whether to perform interrupt adjustment. Upon a checkmark being input to the checkbox 1102 by the operator, interrupt adjustment for the print job is enabled. Upon the checkmark being deleted from the checkbox 1102, interrupt adjustment for the print job is disabled. Upon pressing of an OK button 1103, the print job management unit 342 is notified of the state of the checkbox 1102 that is currently displayed, and the UI screen 1101 is closed. Upon pressing of a cancel button 1104, the interrupt adjustment setting unit 345 immediately closes the UI screen 1101.

Print Job Execution Flow in First Embodiment

A description will be given of a print job execution flow involving interrupt adjustment according to the present embodiment.

To execute a print job, processes are individually performed by the image processing apparatus 20 and the image forming apparatus 10, and the processes will be described in order. First, the process performed by the image processing apparatus 20 will be described.

Figure 4:
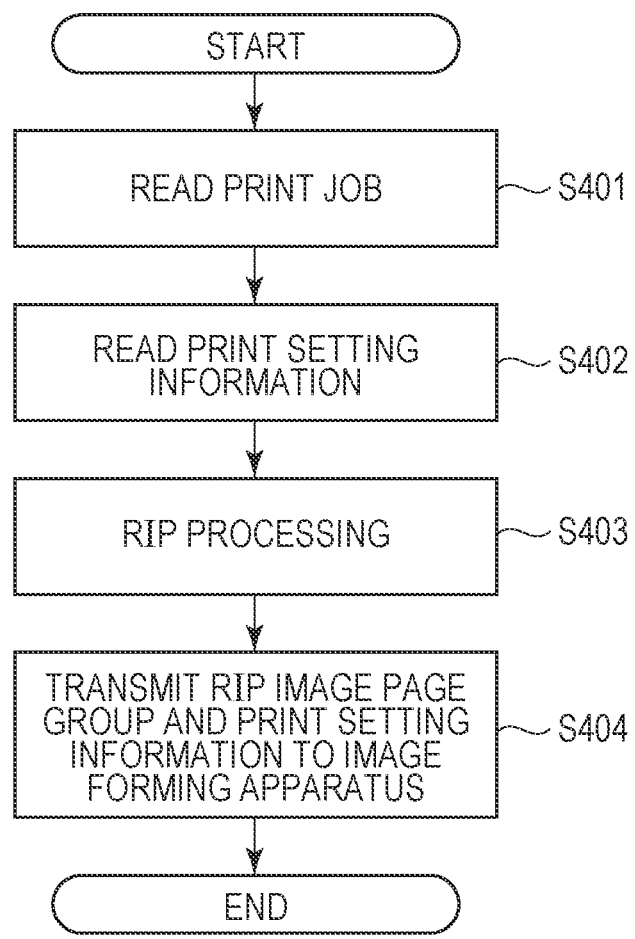
FIG. 4 is a flowchart illustrating a process executed by an image processing apparatus according to the first embodiment.

FIG. 4 is a flowchart illustrating the process executed by the image processing apparatus 20. This process is implemented by a program stored in the HDD 144 of the image processing apparatus 20 being loaded into the RAM 143 and executed by the CPU 141. This process starts upon pressing of the print button 903 with a print job being selected on the UI screen 901 of the print management application.

In S401, the print job management unit 342 reads data of the target print job.

In S402, the print job management unit 342 reads print setting information about print settings. There are the items described above with reference to FIGS. 10 and 11, and also there are a page layout setting of the print job, and a setting related to a color management system (CMS) such as a color profile. Furthermore, the print setting information about print settings includes many items, for example, a setting related to image processing correction such as a half tone, and a setting related to an operation of a finishing device. The print settings for the print job are of course not limited to the items described here, and include other various setting items.

In S403, the print job processing unit 343 performs RIP processing on the print job. The RIP processing on the print job herein means analyzing the input print job and performing processing including color conversion in accordance with the print setting information read in S402 to develop the print job into rasterized image data. After the RIP processing, the print job becomes an image data group in units of pages.

In S404, the print job management unit 342 transmits the processed print job data to the image forming apparatus 10 via the data transmitting/receiving unit 344. The print job data includes, in addition to the developed page image data group, the setting item information of the print job to be used for the process in the image forming apparatus 10. After S404, the print job management unit 342 ends the process.

Next, the process performed by the image forming apparatus 10 will be described. First, a print mode switching method for switching the print mode of the printer 200 will be described.

Figure 5:
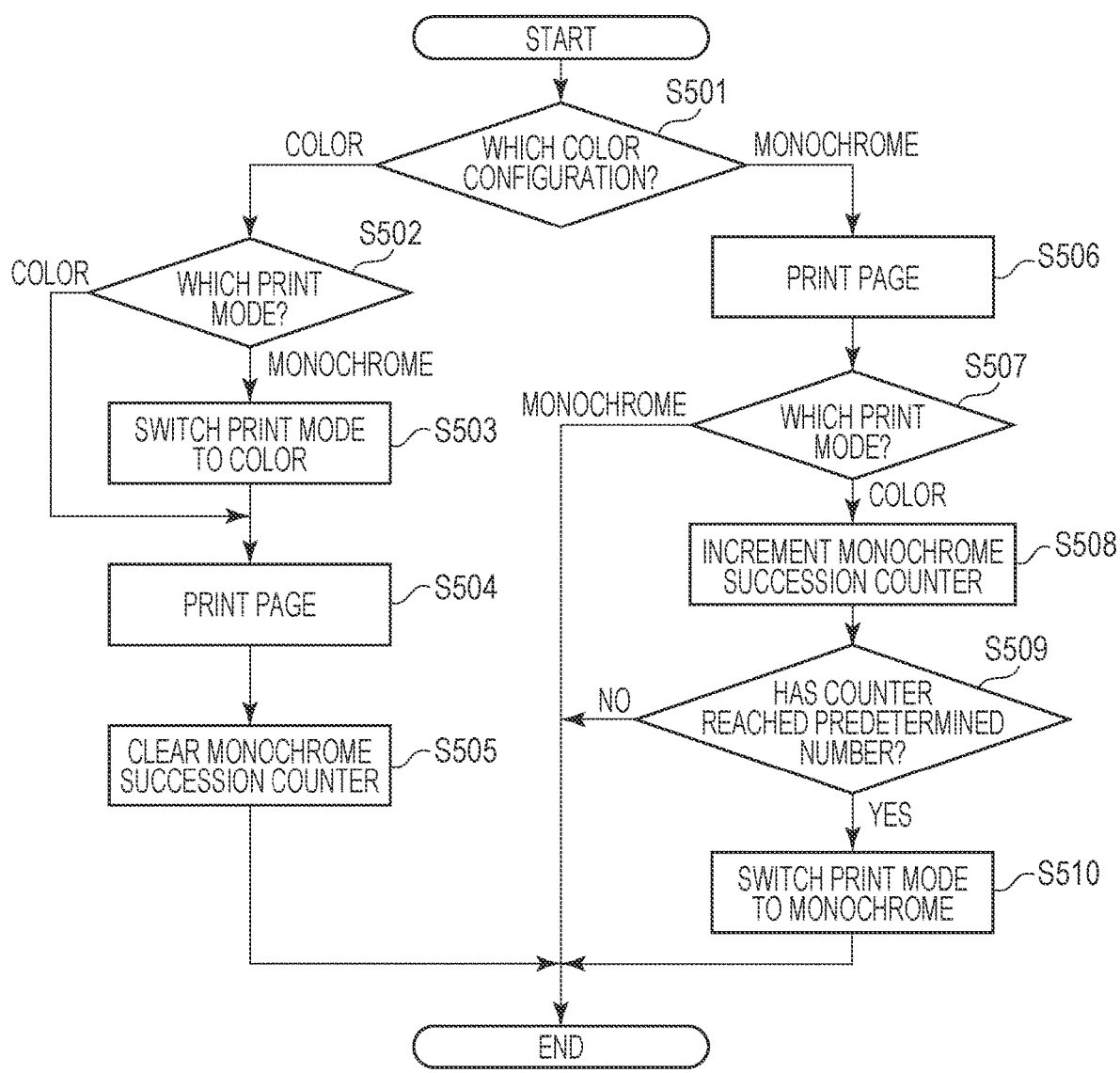
FIG. 5 is a flowchart illustrating print control executed by an image forming apparatus according to the first embodiment.

FIG. 5 is a flowchart illustrating a process executed by the print mode switching unit 311 included in the engine control unit 304 of the device controller 100 in the image forming apparatus 10. This process is implemented by a program stored in the HDD 114 of the image forming apparatus 10 being loaded into the RAM 113 and executed by the CPU 111.

This process starts upon printing execution by the engine control unit 304 of the page image data that has been subjected to a printing process in the page image control unit 303. This process is executed when a process for a print job described below proceeds to S6104 or S6205.

In S501, the print mode switching unit 311 determines the color configuration (color attribute) of page image data that has been read. Here, the color configuration means the number of colors used to form page image data. In the printer 200 according to the present embodiment, four toners of C, M, Y, and K can be used. If the page image data is formed only with the K toner, it is determined that the color configuration is "monochrome". In the case of a configuration other than "monochrome", that is, if the page image data includes the C, M, or Y toner even in a small amount, it is determined that the color configuration is "color". If it is determined in S501 that the page configuration is "color", the process proceeds to S502.

In S502, the print mode switching unit 311 determines the current print mode of the printer 200. If it is determined in S502 that the print mode is color, the process proceeds to S504. If it is determined in S502 that the print mode is monochrome, the process proceeds to S503. In S503, the print mode switching unit 311 switches the print mode of the printer 200 to the color image formation mode via the engine control unit 304. The method for controlling switching is as described above. Because the color configuration of the page image to be printed is color, printing is not executable if the print mode is kept in the monochrome image formation mode. Thus, the print mode is switched at this timing.

In S504, the engine control unit 304 receives an instruction from the print mode switching unit 311 and executes printing of the target page image. In S505, the print mode switching unit 311 clears a monochrome succession counter to zero.

Now, the monochrome succession counter will be described. The monochrome succession counter is information managed by the print mode switching unit 311, stored in the HDD 114 or the ROM 112, and defined as a condition for switching the print mode of the printer 200. In the present embodiment, the monochrome succession counter is defined as information indicating the number of successive pages, and the value of a predetermined number of pages is, for example, 100.

The value of the predetermined number of pages is held as a fixed value by the print mode switching unit 311, but is not limited thereto. For example, the value may be dynamically set in response to an input by an operator or an administrator through an operation setting screen which is not illustrated. Furthermore, the monochrome succession counter may define an index different from the number of successive pages, for example, an elapsed time or the number of jobs. The print mode switching unit 311 ends this process after finishing S505.

Referring back to S501, if it is determined in S501 that the page configuration is "monochrome", the process proceeds to S506. In S506, as in S504, the engine control unit 304 receives an instruction from the print mode switching unit 311 and executes printing of the target page image. Because the color configuration of the page image data is monochrome, printing can be executed regardless of the print mode of the printer 200.

In S507, the print mode switching unit 311 determines the current print mode of the printer 200. If it is determined in S507 that the print mode is color, the process proceeds to S508. If it is determined in S507 that the print mode is monochrome, the process ends.

In S508, the print mode switching unit 311 increments the monochrome succession counter by one. When a monochrome page image has been printed with the print mode of the printer 200 being the color image formation mode, the counter is incremented by one.

In S509, the print mode switching unit 311 determines whether the monochrome succession counter has reached the predetermined number of pages. In the present embodiment, the predetermined number of pages is set to, for example, 100. If the counter has reached the predetermined number, the process proceeds to S510. If the counter has not reached the predetermined number, the process ends. In S510, the print mode switching unit 311 switches the print mode of the printer 200 to the monochrome image formation mode via the engine control unit 304. The print mode is switched to the monochrome image formation mode to prevent the consumption of color toners that are not used and wearing out of members resulting from successive printing of the predetermined number of monochrome image pages. The process of printing page image data has been described. This process is executed on all the pages to be printed.

Next, a process of a print job involving interrupt adjustment will be described.

Figure 6:
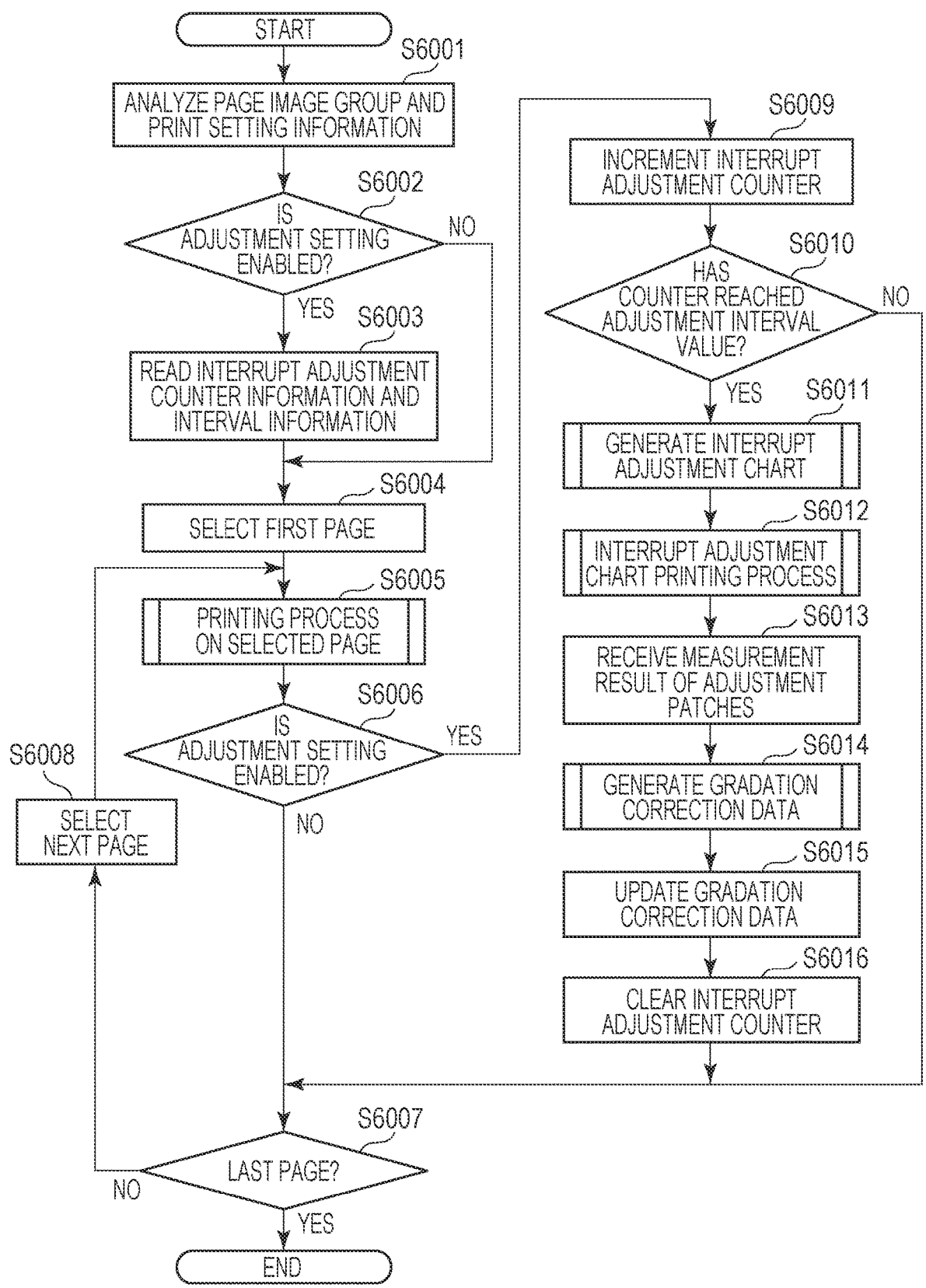
FIG. 6 is a flowchart illustrating interrupt adjustment executed by the image forming apparatus according to the first embodiment.

FIG. 6 is a flowchart illustrating a process of a print job involving interrupt adjustment, executed in the image forming apparatus 10. This process is implemented by a program stored in the HDD 114 of the image forming apparatus 10 being loaded into the RAM 113 and executed by the CPU 111. This process starts upon receipt of image data after completion of a printing process of a print job in the image processing apparatus 20 in S404.

In S6001, the page image analyzing unit 302 analyzes the received print job.

Here, the image data group of the received print job and the contents of setting item information are checked. In S6002, the page image analyzing unit 302 determines whether the interrupt adjustment setting is enabled. If enabled, the process proceeds to S6003. In S6003, the interrupt adjustment chart print control unit 309 reads interrupt adjustment counter information and adjustment interval information.

If it is determined in S6002 that the interrupt adjustment setting is disabled, or after S6003, the process proceeds to S6004. In S6004, the page image control unit 303 selects the image data of the first page of the print job that has been received and analyzed. In S6005, the page image control unit 303 executes a printing process on the selected page.

Figure 19A:
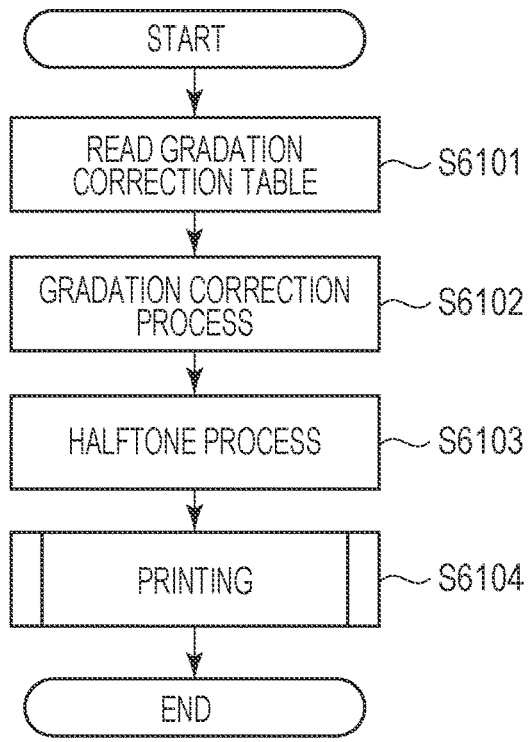
FIG. 19A is a flowchart illustrating a printing process executed by the image forming apparatus.

Now, the printing process on the page executed in S6005 will be described with reference to FIG. 19A. FIG. 19A is a flowchart illustrating a print process on a page image executed in the image forming apparatus 10. This process is implemented by a program stored in the HDD 114 of the image forming apparatus 10 being loaded into the RAM 113 and executed by the CPU 111.

In S6101, the page image control unit 303 reads a gradation correction table described below.

In S6102, the page image control unit 303 executes a gradation correction process.

Now, the gradation correction process will be described. The gradation correction process is a correction process for keeping the output density of the image forming apparatus 10 constant. The printer 200 that performs printing by controlling toner and ink is susceptible to the temperature, humidity, and so forth of the environment in which the sheets for printing and the apparatus are installed, and the output density of printing constantly changes. Even pages created by the same image processing have a difference in the image quality of printout when the output density of the printer 200 changes. The gradation correction process may be performed to constantly obtain stable output image quality. The gradation correction process is a process of correcting print data to achieve a predetermined optimum output of toner or an ink component. The gradation correction process is typically implemented by having a look-up table (LUT) for converting input signal values into output signal values for realizing appropriate output in units of toners or ink components, and by executing correction using the LUT at the time of print data processing. Here, the LUT for conversion is referred to as a gradation correction table.

The principle of the gradation correction process will be described with reference to FIGS. 13A to 13C. The data illustrated here is stored in the HDD 114 and is managed by the page image control unit 303.

FIG. 13A illustrates an example of a table defining target densities as reference values of output densities of individual colors. Here, information of optimum output density values is defined for ten input signals of 10% to 100%. The target information may be information defined by a printer vendor in advance, or information generated by registering values obtained by actually measuring outputs by an operator via the operation unit 130.

FIG. 13B illustrates an example of measured values obtained by printing gradation patch images created from ten input signal values at a certain time point and reading the densities thereof. These measured values correspond to the current output densities of the printer 200. The page image control unit 303 calculates a gradation correction table from the gradation targets (reference values) in FIG. 13A and the measured values in FIG. 13B.

FIG. 13C illustrates an example of correction values calculated as differences in density. A difference may be used as a correction value as is, or a value obtained through a certain process, such as multiplication by a constant, may be used as a correction value. Based on these correction values, signal values having the same densities as the target densities of input signal values are correlated as output signal values to generate a gradation correction table. In this example, ten input signal values are used for description, but the number of input signal values is not limited thereto. The accuracy of correction increases as the number of signal values to be used increases, but the number of patches used for measurement also increases. In addition, an output density varies according to the sheet on which printing is performed, and thus a gradation target and a gradation correction table may be held in units of sheets. The gradation correction process for all the four colors has been described here, but it is not necessary to perform the gradation correction process for all the colors at one time. The gradation correction process for only one color or some colors may be performed. In the present embodiment, the correction process is performed for all the four colors when the adjustment chart described below is constituted by the four colors, whereas the correction process is performed for black color when the adjustment chart is monochrome.

In accordance with the above-described process, in S6102, the page image control unit 303 converts a signal value of the target page image to be processed, by using the gradation correction table read in S6101.

In S6103, the page image control unit 303 executes a halftone process. The halftone process is a process of converting a signal value of a page image expressed in multi-gradation into a small gradation number that can be output by the printer 200. This is generally known as a technique of expressing multi-gradation in a pseudo manner while decreasing the gradation number by expressing each pixel of a page image in multi-area. In S6104, the engine control unit 304 forms the page image data converted to be printable by the printer 200 on a sheet, and executes a printing process. In the present embodiment, a process of switching the print mode of the printer 200 by the print mode switching unit 311 in accordance with the color configuration of the page image occurs. The printing process is as described above with reference to FIG. 5. When printing out of the target page has been completed, this process ends.

Referring back to the flowchart in FIG. 6, in S6006, the page image control unit 303 determines whether the interrupt adjustment setting is enabled, as in S6002.

If it is determined in S6006 that the interrupt adjustment setting is disabled, the process proceeds to S6007, where the page image control unit 303 determines whether the processed page is the last page of the print job. If it is determined that the processed page is the last page, the process ends. If it is determined that the processed page is not the last page, the next page is selected in S6008, and the process returns to S6005. If it is determined in S6006 that the interrupt adjustment setting is enabled, the process proceeds to S6009. In S6009, the interrupt adjustment chart print control unit 309 increments the adjustment counter read in S6003 by one.

In S6010, the interrupt adjustment chart print control unit 309 determines whether the adjustment counter has reached the set value of the adjustment interval read in S6003. If the adjustment counter has reached the adjustment interval value, an adjustment chart printing process is executed in the following S6011 or thereafter. If the adjustment counter has not reached the adjustment interval value, the process returns to S6007, and the above-described process is continued.

If it is determined in S6010 that the adjustment counter has reached the adjustment interval value, the interrupt adjustment chart determining unit 308 and the interrupt adjustment chart print control unit 309 generate an interrupt adjustment chart in S6011.

Figure 7:
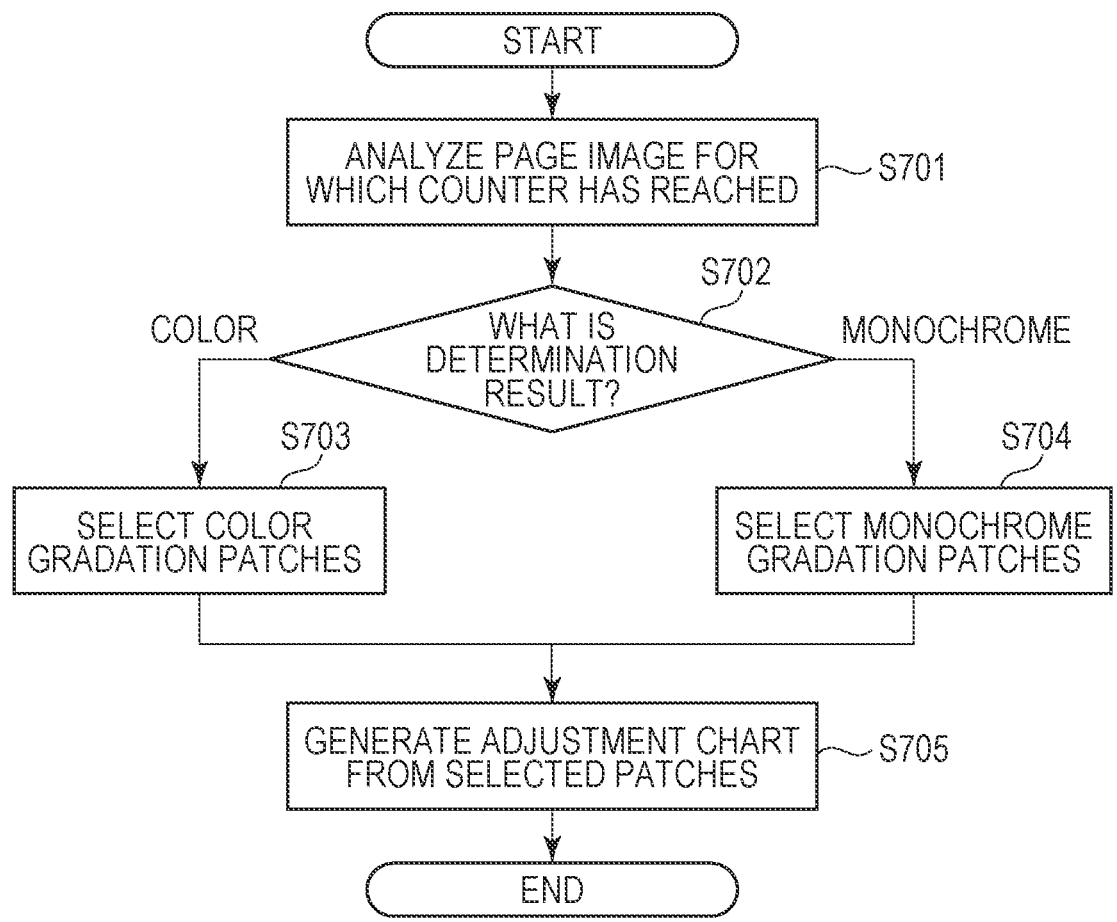
FIG. 7 is a flowchart illustrating generation of a page image of an adjustment chart executed by the image forming apparatus according to the first embodiment.

Now, determination and generation of an interrupt adjustment chart executed in S6011 will be described. FIG. 7 is a flowchart illustrating a process of generating an interrupt adjustment chart in S6011. This process is implemented by a program stored in the HDD 114 of the image forming apparatus 10 being loaded into the RAM 113 and executed by the CPU 111.

In S701, the interrupt adjustment chart determining unit 308 analyzes the page image for which the adjustment counter has reached the adjustment interval value, that is, analyzes the page image of the predetermined number-th page. Specifically, the interrupt adjustment chart determining unit 308 analyzes the color configuration information of the target page image. The color configuration information is as described in S501 above.

In S702, the interrupt adjustment chart determining unit 308 determines, based on the analysis result in S701, whether the color configuration of the page image is color or monochrome. In the case of color, the process proceeds to S703. In the case of monochrome, the process proceeds to S704. If it is determined in S702 that the color configuration is color, the process proceeds to S703, where the interrupt adjustment chart determining unit 308 selects color gradation patches. The gradation patches will be described below.

If it is determined in S702 that the color configuration is monochrome, the process proceeds to S704, where the interrupt adjustment chart determining unit 308 selects monochrome gradation patches. The gradation patches will be described below. In S705, the interrupt adjustment chart determining unit 308 creates page image data for an adjustment chart by using the gradation patches selected in S703 or S704.

Figure 12A:
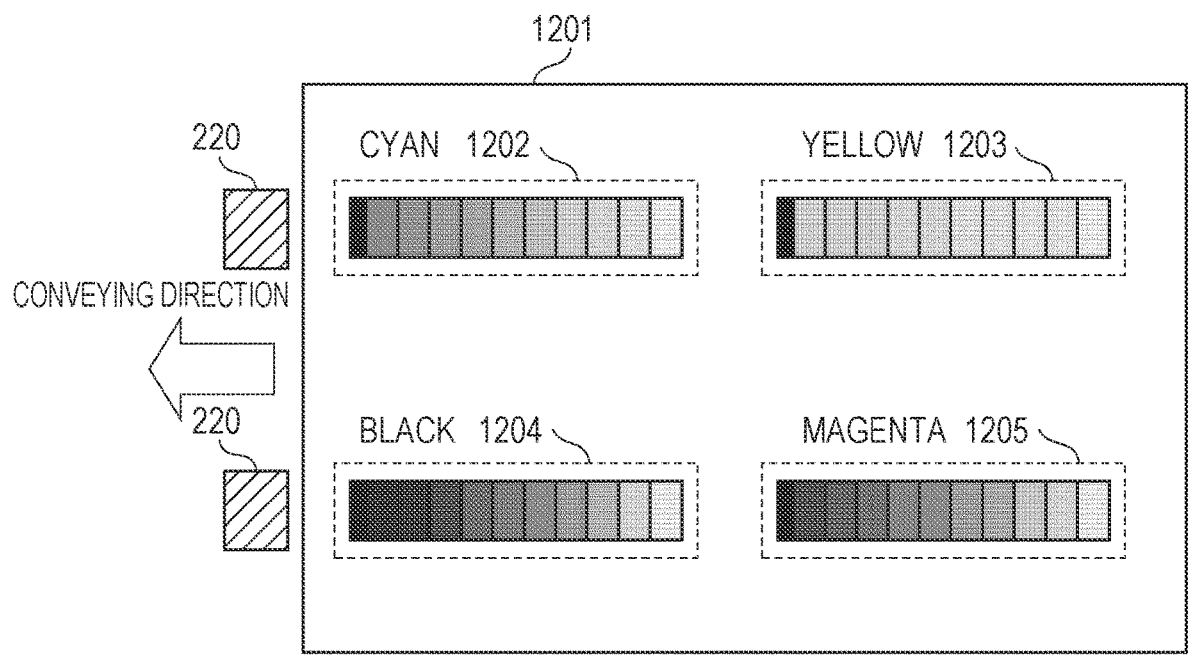
FIGS. 12A and 12B are diagrams each illustrating an example of layout of an adjustment chart.
Figure 12B:
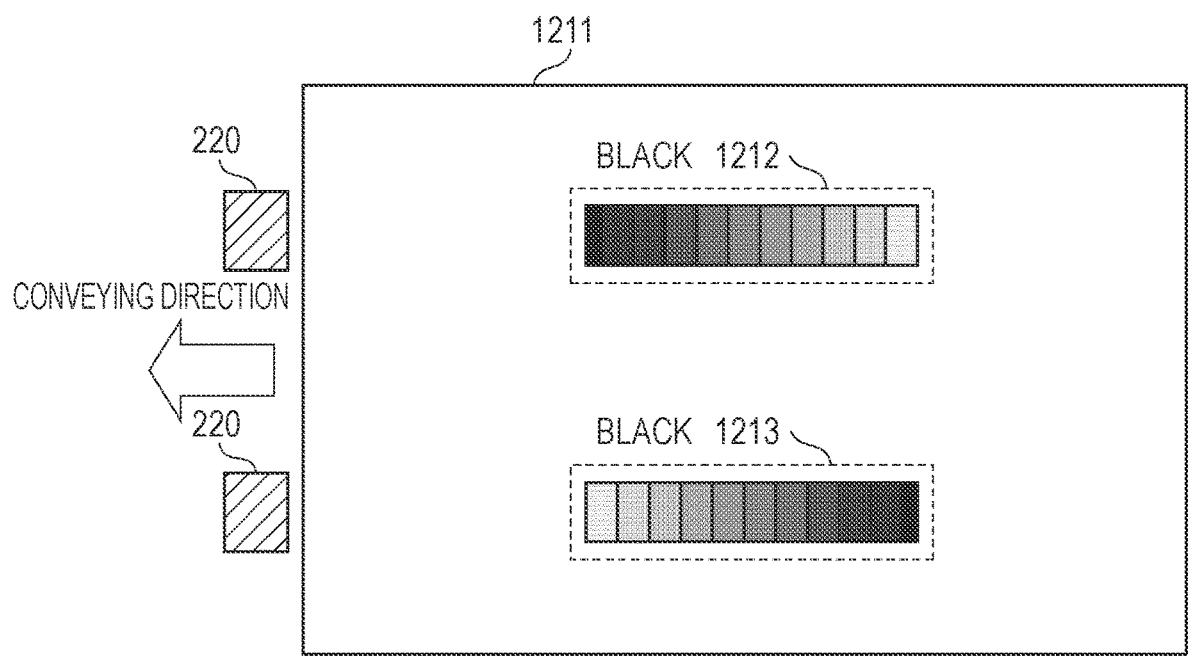

Now, a page of an adjustment chart to be generated will be described with reference to FIGS. 12A and 12B. FIGS. 12A and 12B are diagrams each illustrating an example of a page image of an adjustment chart (gradation pattern image). This chart is determined and generated by the interrupt adjustment chart determining unit 308. A page image 1201 is a page image example in a case where color gradation patches are selected in S703. A page image 1211 is a page image example in a case where monochrome gradation patches are selected in S704.

In the page image 1201, gradation patches expressed by toners of four colors are arranged at predetermined positions in the page (1202 to 1205). In this example, each toner is configured as ten gradation patches having stepwise variations in density. However, the number of patches is not limited thereto, as described above in the gradation correction process. The sensor 220 in FIG. 2 is installed on the sheet conveyance path, and the gradation patches 1202 to 1205 are arranged in the page image so as to pass the position of the sensor 220. Here, the sensor 220 includes two sensors 220 that are fixed and disposed, but the number and position of the sensors 220 are not limited thereto. One sensor 220 may be fixed and disposed in a certain place, or four sensors 220 may be fixed and disposed in certain places. Alternatively, one or more sensors 220 may be installed in a movable state. Furthermore, the adjustment chart to be generated may have a layout that allows the sensors 220 to read the gradation patches in accordance with the number and installation state of the sensors 220. In addition, the layout of the gradation patches on the adjustment chart may be changed in accordance with the size or type of sheet so that the sensor 220 is capable of reading the gradation patches.

In the page image 1211, gradation patches expressed by a black toner of a single color are arranged at predetermined positions in the page (1212 and 1213). In this example, the black toner is configured as twenty gradation patches having stepwise variations in density. However, the number and layout of arranged gradation patches are not limited thereto, as described above. When S705 has been finished, the process proceeds to S6012.

In S6012, the interrupt adjustment chart print control unit 309 executes an interrupt adjustment chart printing process. Now, the interrupt adjustment chart printing process executed in S6012 will be described with reference to FIG. 19B.

Figure 19B:
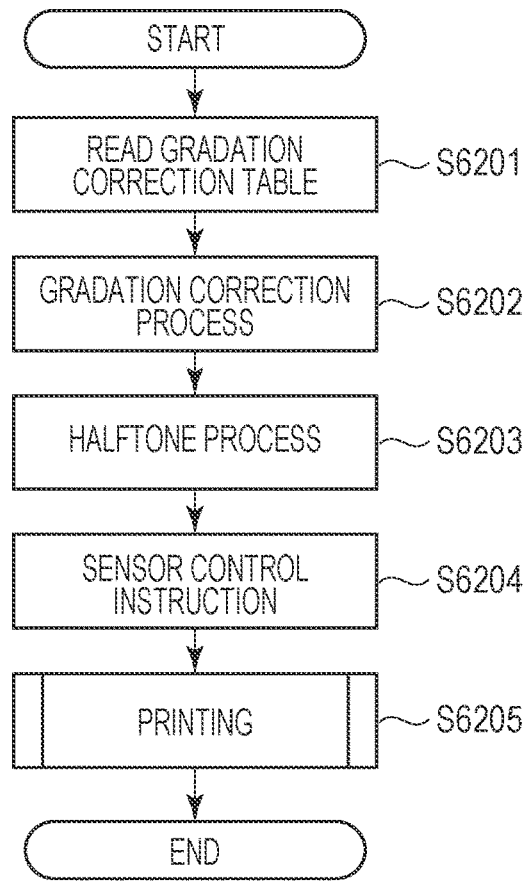
FIG. 19B is a flowchart illustrating an interrupt adjustment chart printing process executed by the image forming apparatus.

FIG. 19B is a flowchart illustrating the interrupt adjustment chart printing process performed in the image forming apparatus 10. This process is implemented by a program stored in the HDD 114 of the image forming apparatus 10 being loaded into the RAM 113 and executed by the CPU 111.

In S6201, the interrupt adjustment chart print control unit 309 reads the current gradation correction table. In S6202, the interrupt adjustment chart print control unit 309 executes a gradation correction process. In S6203, the interrupt adjustment chart print control unit 309 executes a halftone process. In S6204, the interrupt adjustment chart print control unit 309 instructs the sensor control unit 305 to control the sensor 220 and measure the densities of the gradation patches formed and printed on the page image 1201 or 1211.

In S6205, the engine control unit 304 forms the page image of the adjustment chart (gradation pattern image) on a sheet, thereby performing printing out. At the same time, the sensor control unit 305 measures the densities of patches. In the present embodiment, a process of switching the print mode of the printer 200 by the print mode switching unit 311 in accordance with the color configuration of the page image occurs. The printing process is as described above with reference to FIG. 5. When printing has been completed, this process ends.

Referring back to the flowchart in FIG. 6, in S6013, the interrupt adjustment executing unit 310 receives a measurement result of the adjustment patches obtained by the sensor 220. In S6014, the interrupt adjustment executing unit 310 generates gradation correction data. Now, a gradation correction data generation process executed in S6014 will be described with reference to FIG. 19C. The principle of gradation correction is as described above.

Figure 19C:
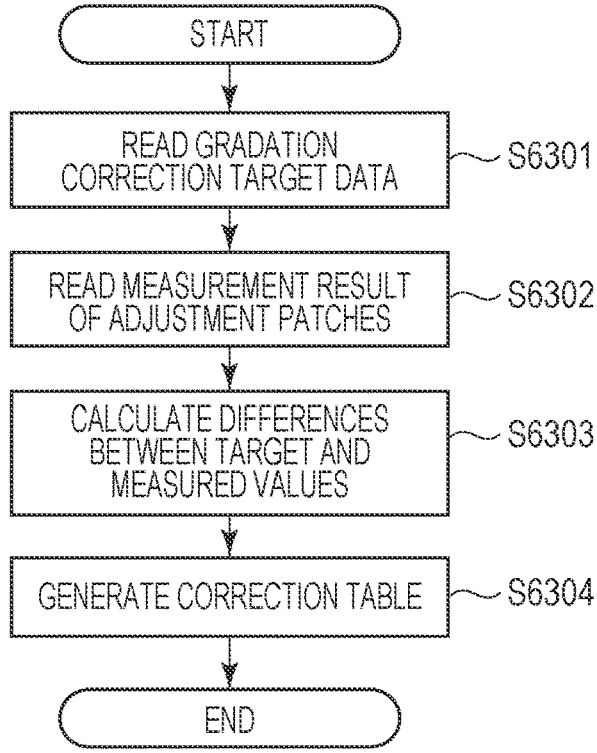
FIG. 19C is a flowchart illustrating a gradation correction data generation process executed by the image forming apparatus.

FIG. 19C is a flowchart illustrating a gradation correction data generation process performed in the image forming apparatus 10. This process is implemented by a program stored in the HDD 114 of the image forming apparatus 10 being loaded into the RAM 113 and executed by the CPU 111.

In S6301, the interrupt adjustment executing unit 310 reads a gradation correction target corresponding to the sheet on which the adjustment chart has been printed from the page image control unit 303. In S6302, the interrupt adjustment executing unit 310 reads the measurement result of the adjustment patches of the sensor 220 received in S6013. In S6303, the interrupt adjustment executing unit 310 calculates differences between the gradation target and the measured values. In S6304, the interrupt adjustment executing unit 310 generates a new gradation correction table from the calculated differences. In this way, a new gradation correction table is generated every time an interrupt occurs and an adjustment chart is output.

As described above, the new correction table to be generated may be changed in accordance with the color configuration of the adjustment patches measured in S6013. In the present embodiment, a gradation correction table is generated for all the four colors if the configuration of the adjustment chart is formed of the four colors, and a gradation correction table is generated for a black single color if the configuration of the adjustment chart is monochrome.

Referring back to the flowchart in FIG. 6, in S6015, the interrupt adjustment executing unit 310 updates the gradation correction table with the newly generated gradation correction table and stores the new gradation correction table. In S6016, the interrupt adjustment chart print control unit 309 clears the interrupt adjustment counter, and the process proceeds to S6007 to continue the above-described process.

As a result of executing this process, an adjustment chart is generated and printed every time the number of printed pages reaches the set adjustment interval during printing of a print job for which the adjustment setting is enabled. Based on measured values obtained by measuring gradation patches printed on an adjustment chart, a gradation correction table is newly generated and update therewith is performed. The updated gradation correction table is applied to a printing process immediately after the update, and thus stable output image quality can be obtained during printing of a print job.

According to the present embodiment, in the printing system in which an adjustment chart is printed during execution of a print job and a measurement result of patch densities of the adjustment chart is applied to a gradation correction process, the gradation patches of the adjustment chart are changed in accordance with the color configuration of the print job. Accordingly, color adjustment can be performed if a page of the print job is constituted by a color image, whereas monochrome adjustment can be performed if the page is constituted by a monochrome image, while switching between color adjustment and monochrome adjustment being performed. As a result, it is possible to prevent unnecessary consumption of toner or wearing out of members of the apparatus.

Second Embodiment

In the first embodiment, a process of making a determination based on an analysis result of a page image when the counter has reached is described as a method for determining the configuration of gradation patches of an adjustment chart. In a second embodiment, a description will be given of a method for determining the configuration of an adjustment chart different from that of the first embodiment. The hardware configuration, the software configuration, and the printing process are the same as those in the first embodiment, and thus the drawings and description thereof are omitted. Hereinafter, only differences will be described. In the present embodiment, generation of an interrupt adjustment chart in S6011 in the flowchart in FIG. 6 is different.

Figure 14:
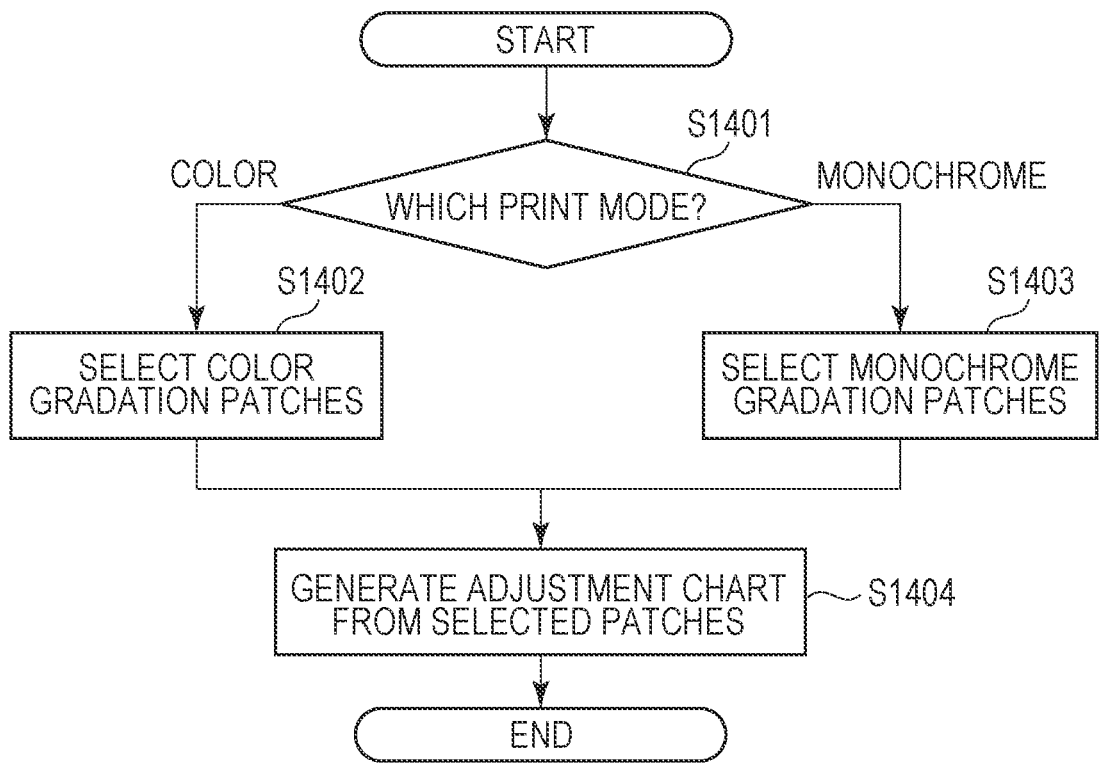
FIG. 14 is a flowchart illustrating generation of a page image of an adjustment chart according to a second embodiment.

FIG. 14 is a flowchart illustrating a process of generating an interrupt adjustment chart in S6011 according to the present embodiment. This process is implemented by a program stored in the HDD 114 of the image forming apparatus 10 being loaded into the RAM 113 and executed by the CPU 111.

In S1401, the interrupt adjustment chart determining unit 308 checks the print mode (image formation mode) of the printer 200 controlled by the engine control unit 304. The print mode (image formation mode) has been dynamically switched in accordance with the process described with reference to FIG. 5, and has become either the color image formation mode or the monochrome image formation mode. In the case of the color image formation mode, the process proceeds to S1402. In the case of the monochrome image formation mode, the process proceeds to S1403.

If it is determined in S1401 that the print mode is the color image formation mode, the process proceeds to S1402, where the interrupt adjustment chart determining unit 308 selects color gradation patches. If it is determined in S1401 that the print mode is the monochrome image formation mode, the process proceeds to S1403, where the interrupt adjustment chart determining unit 308 selects monochrome gradation patches.

S1404 is the same as S705 and thus the description thereof is omitted. The printing process after generation of the adjustment chart in S6011 is the same as in the first embodiment, and thus the description thereof is omitted.

According to the present embodiment, the interrupt adjustment chart determining unit 308 changes gradation patches of an adjustment chart in accordance with the print mode of the printer 200 controlled by the engine control unit 304. Accordingly, color adjustment can be performed if a page of a print job is constituted by a color image, whereas monochrome adjustment can be performed if the page is constituted by a monochrome image, while switching between color adjustment and monochrome adjustment being performed. As a result, it is possible to prevent unnecessary consumption of toner or wearing out of members of the apparatus.

In the configuration in which the print mode is switched between color and monochrome, downtime occurs for switching the print mode from the monochrome image formation mode to the color image formation mode to print color patches. According to the present embodiment, the occurrence of downtime can be prevented.

Third Embodiment

In the first and second embodiments, a description has been given of a configuration in which the device controller 100 of the image forming apparatus 10 executes generation and control of an interrupt adjustment chart for executing interrupt adjustment.

In a third embodiment, a description will be given of a configuration in which the RIP controller 140 of the image processing apparatus 20 generates an interrupt adjustment chart. Hereinafter, only differences will be described.

The hardware configuration is the same as that in the first embodiment, and thus the drawings and description thereof are omitted.

Figure 15A:
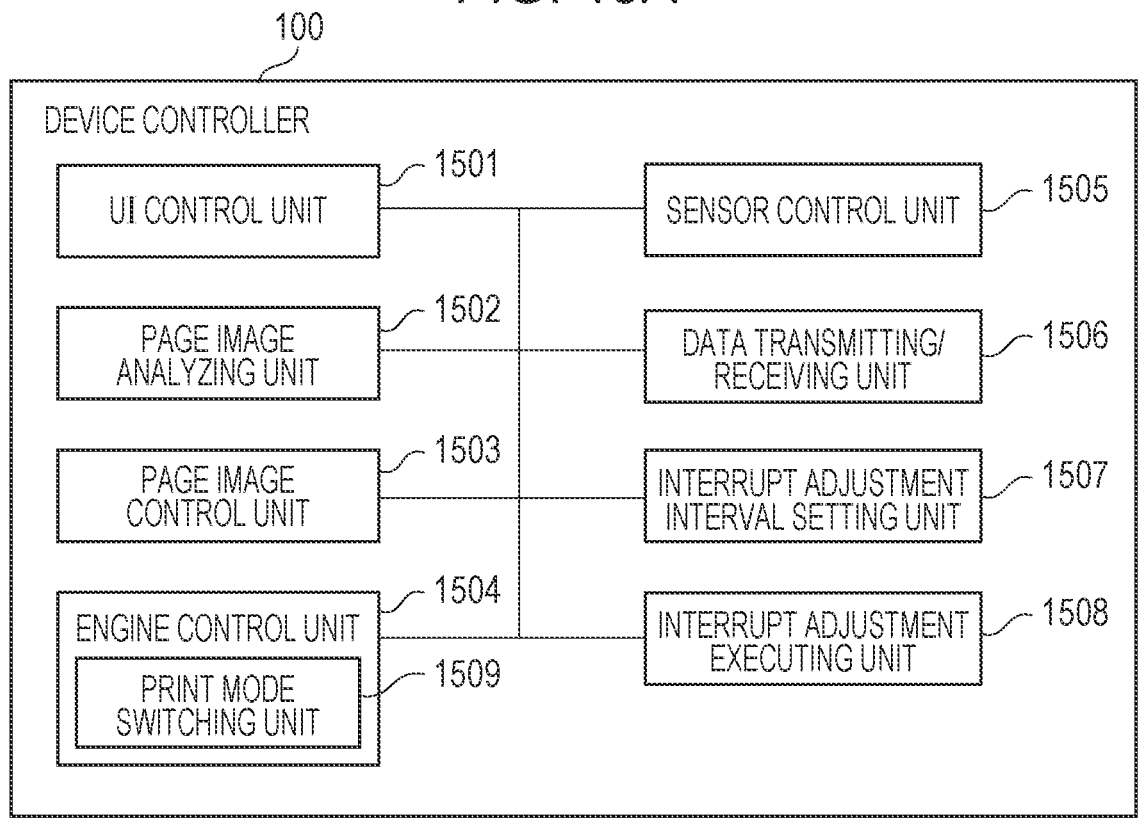
FIGS. 15A and 15B are block diagrams each illustrating an example of a software configuration of the printing system according to a third embodiment.

FIG. 15A is a block diagram of the device controller 100, illustrating a software module configuration of the image forming apparatus 10. These software modules are stored as a program in the HDD 114, and are loaded into the RAM 113 and executed by the CPU 111.

The control of a UI control unit 1501, a page image analyzing unit 1502, a page image control unit 1503, an engine control unit 1504, and a sensor control unit 1505 is the same as the control of the respective units 301 to 305 having the same names in FIG. 3A, and thus the description thereof is omitted. The control of an interrupt adjustment interval setting unit 1507, an interrupt adjustment executing unit 1508, and a print mode switching unit 1509 is the same as the control of the respective units 307, 310, and 311 having the same names in FIG. 3A, and thus the description thereof is omitted.

The control of a data transmitting/receiving unit 1506 is the same as the control of the data transmitting/receiving unit 306, and the data transmitting/receiving unit 1506 controls transmission/reception of data to/from the image processing apparatus 20. The data that is transmitted/received is, for example, data of a print job, setting registration information stored in the image forming apparatus 10, or the like. Furthermore, in the present embodiment, the data transmitting/receiving unit 1506 transmits a set value that is set in the interrupt adjustment interval setting unit 1507 and print mode information of the printer 200 to the image processing apparatus 20.

Figure 15B:
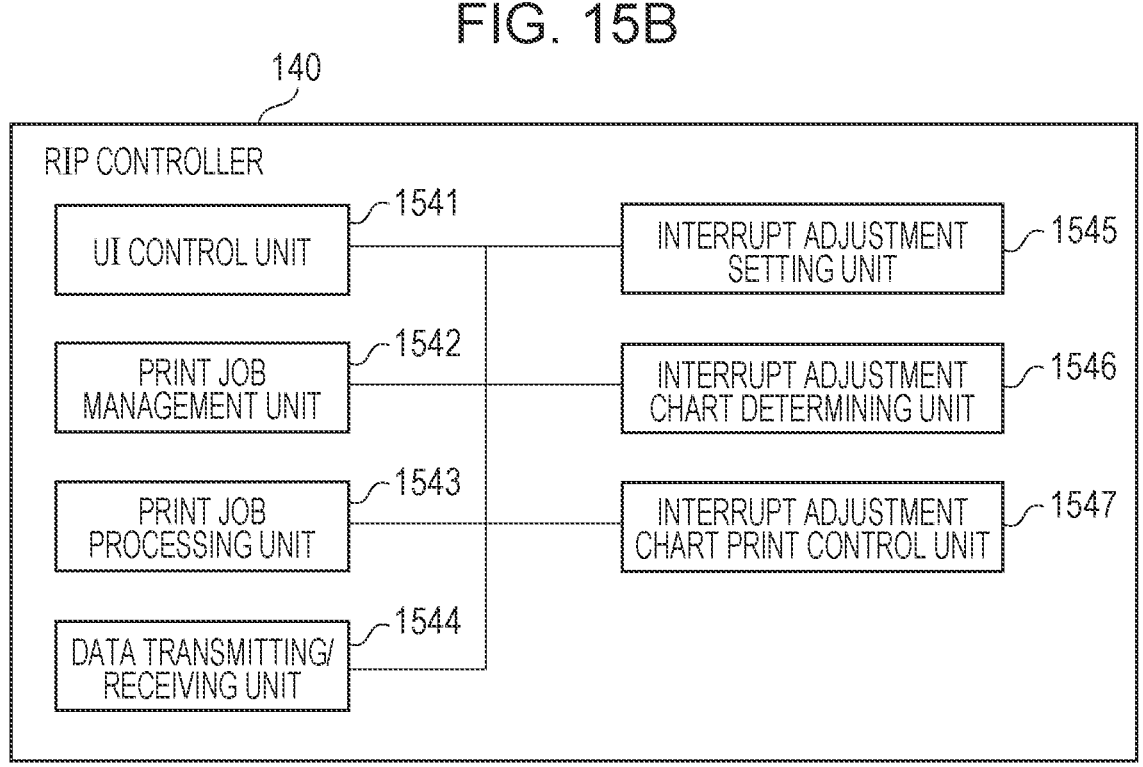

FIG. 15B is a block diagram of the RIP controller 140, illustrating a software module configuration of the image processing apparatus 20. These software modules are stored as a program in the HDD 144, and are loaded into the RAM 143 and executed by the CPU 141.

The control of a UI control unit 1541, a print job management unit 1542, a print job processing unit 1543, and an interrupt adjustment setting unit 1545 is the same as the control of the respective units 341 to 343 and 345 having the same names in FIG. 3B, and thus the description thereof is omitted.

The control of a data transmitting/receiving unit 1544 is the same as the control of the data transmitting/receiving unit 344, and the data transmitting/receiving unit 1544 manages transmission/reception of various data to/from the image forming apparatus 10. Print job data generated by the print job processing unit 1543 is transmitted to the image forming apparatus 10 by the data transmitting/receiving unit 1544. In addition, the data transmitting/receiving unit 1544 manages transmission/reception of data to/from the client PC 30 connected via the external network 40. Furthermore, in the present embodiment, the data transmitting/receiving unit 1544 receives a set value that is set in the interrupt adjustment interval setting unit 1507 and print mode information of the printer 200 from the image forming apparatus 10.

An interrupt adjustment chart determining unit 1546 is the same as the interrupt adjustment chart determining unit 308 of the device controller 100 according to the first and second embodiments. The interrupt adjustment chart determining unit 1546 receives information to be used for a determination from the image forming apparatus 10, and determines a patch layout configuration of an interrupt adjustment chart.

An interrupt adjustment chart print control unit 1547 is the same as the interrupt adjustment chart print control unit 309 of the device controller 100 according to the first and second embodiments. To print an adjustment chart at a designated interval received from the image forming apparatus 10, the interrupt adjustment chart print control unit 1547 performs a process related to counting or clearing of the number of pages of a print job subjected to RIP processing, generation of an adjustment chart image, and insertion of a page into the print job.

Figure 16:
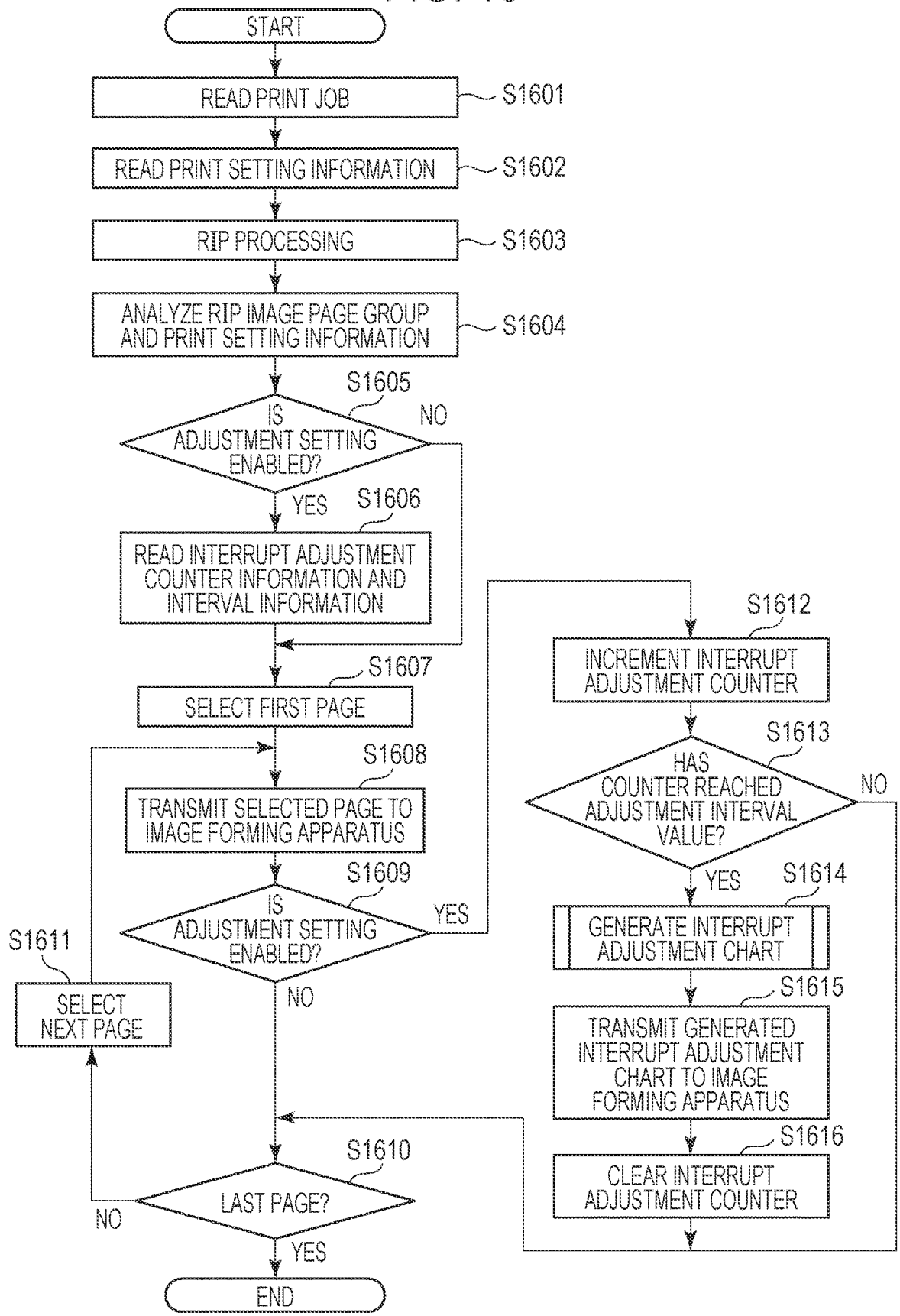
FIG. 16 is a flowchart illustrating a process executed by the image processing apparatus according to the third embodiment.

FIG. 16 is a flowchart illustrating a process of a print job involving interrupt adjustment performed in the image processing apparatus 20 according to the present embodiment. This process is implemented by a program stored in the HDD 144 of the image processing apparatus 20 being loaded into the RAM 143 and executed by the CPU 141.

A description will be given mainly of a difference from the processes described with reference to FIGS. 4 to 6 in the first and second embodiments.

S1601 to S1603 are the same as S401 to S403 in the first and second embodiments, and thus the description thereof is omitted. In S1604, the print job processing unit 1543 analyzes the image page group that has been subjected to RIP processing and print setting information. Subsequently, in S1605 to S1607, the print job processing unit 1543 performs a process similar to that in S6002 to S6004.

In S1608, the print job management unit 1542 transmits the processed page image to the image forming apparatus 10 via the data transmitting/receiving unit 1544. The print job data includes, in addition to the developed page image data, setting item information on the print job to be used for the process in the image forming apparatus 10.

S1609 to S1611 are executed by the print job management unit 1542. These steps are the same as S6006 to S6008 executed by the page image control unit 303 in the first and second embodiments, and thus the description thereof is omitted.

S1612 and S1613 are executed by the interrupt adjustment chart print control unit 1547. These steps are the same as S6009 and S6010 executed by the interrupt adjustment chart print control unit 309 in the first and second embodiments, and thus the description thereof is omitted. S1614 is executed by the interrupt adjustment chart determining unit 1546. This step is the same as S6011 executed by the interrupt adjustment chart determining unit 308 in the first and second embodiments.

Furthermore, in the first and second embodiments, determination of an interrupt adjustment chart is implemented by the interrupt adjustment chart determining unit 308 of the image forming apparatus 10 in the processes described with reference to FIGS. 7 and 14. In the present embodiment, the determination is implemented by the interrupt adjustment chart determining unit 1546 of the image processing apparatus 20. The method thereof is the same as in the first and second embodiments, and thus the description thereof is omitted.

In S1615, the print job management unit 1542 transmits the processed page image to the image forming apparatus 10 via the data transmitting/receiving unit 1544. The print job data includes, in addition to the developed page image data, information indicating an adjustment chart. S1616 is executed by the interrupt adjustment chart print control unit 1547. This step is the same as S6016 executed by the interrupt adjustment chart print control unit 309 in the first and second embodiments, and thus the description thereof is omitted.

Figure 17:
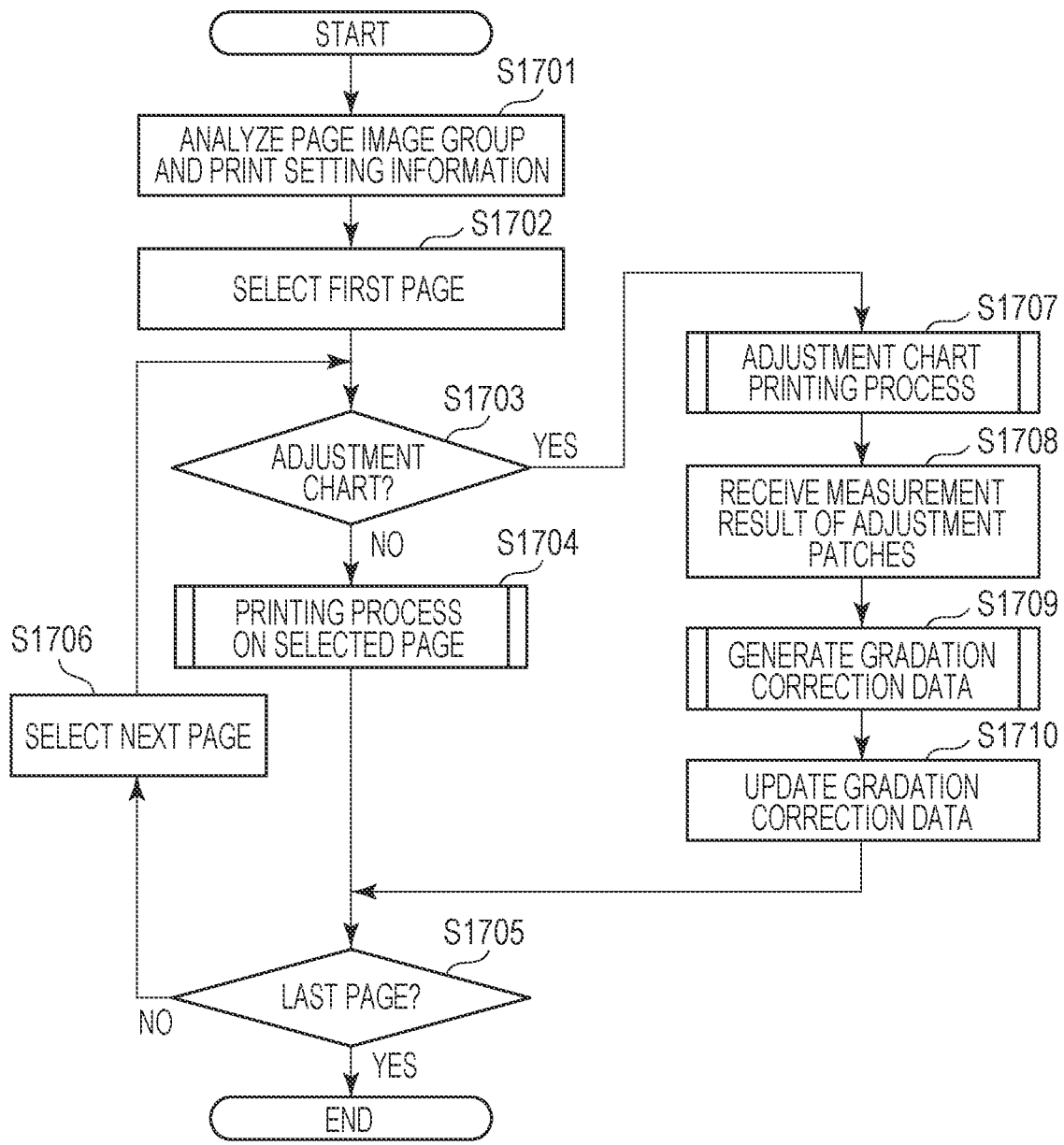
FIG. 17 is a flowchart illustrating print control executed by the image forming apparatus according to the third embodiment.

FIG. 17 is a flowchart illustrating a process of a print job involving interrupt adjustment performed in the image forming apparatus 10. This process is implemented by a program stored in the HDD 114 of the image forming apparatus 10 being loaded into the RAM 113 and executed by the CPU 111.

A description will be given mainly of a difference from the processes described with reference to FIGS. 4 to 6 in the first and second embodiments. S1701 and S1702 are executed by the page image analyzing unit 1502 and the page image control unit 1503. These steps are the same as S6001 and S6004 executed by the page image analyzing unit 302 and the page image control unit 303 in the first and second embodiments, and thus the description thereof is omitted.

In S1703, the page image analyzing unit 1502 determines whether the selected page is a page image for adjustment. The determination is made based on information attached to the adjustment chart transmitted in S1615.

If it is determined in S1703 that the selected page is not an adjustment chart, the process proceeds to S1704, where the page image control unit 1503 executes a printing process on the target page. This step is the same as S6005 in the first and second embodiments. The details thereof are the same as those described with reference to FIG. 19A, and thus the description thereof is omitted. S1705 and S1706 are executed by the page image control unit 1502. These steps are the same as S6007 and S6008 executed by the page image control unit 303 in the first and second embodiments, and thus the description thereof is omitted.

S1707 is executed by the interrupt adjustment chart print control unit 1547. This step is the same as S6012 executed by the interrupt adjustment chart print control unit 309 in the first and second embodiments. The details thereof are the same as those described with reference to FIG. 19B, and thus the description thereof is omitted.

S1708 to S1710 are executed by the interrupt adjustment chart print control unit 1547. These steps are the same as S6013 to S6015 executed by the page image control unit 303 in the first and second embodiments, and thus the description thereof is omitted. In the present embodiment, a description has been given of a configuration of generating and controlling an interrupt adjustment chart by the image processing apparatus 20.

According to the present embodiment, in the printing system in which an adjustment chart is printed during execution of a print job and a measurement result of patch densities of the adjustment chart is applied to a gradation correction process, the gradation patches of the adjustment chart are changed in accordance with the color configuration of the print job. Accordingly, color adjustment can be performed if a page of the print job is constituted by a color image, whereas monochrome adjustment can be performed if the page is constituted by a monochrome image, while switching between color adjustment and monochrome adjustment being performed. As a result, it is possible to prevent unnecessary consumption of toner or wearing out of members of the apparatus.

According to one or more embodiments of the disclosure, the color configuration of a gradation pattern image can be switched in accordance with the image formation mode of an apparatus when printing of a predetermined number of pages has been executed, and thus it is possible to prevent excessive consumption of a recording material to be used for printing of a gradation pattern image.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-213833, filed Dec. 23, 2020, which is hereby incorporated by reference herein in its entirety.

What is claimed is:

1. An apparatus for switching between a color image formation mode in which printing is performed using a plurality of recording materials including a chromatic color recording material and a monochrome image formation mode in which printing is performed using a black single color recording material without using the chromatic color recording material, the apparatus comprising:
    a printer which forms a gradation pattern image on a sheet fed from a sheet feeding stage in accordance with printing of a predetermined number of pages of images having been performed;
    a measuring portion which reads the formed gradation pattern image and measures a color of the gradation pattern image;
    one or more memories storing instructions; and one or more controllers including one or more processors that when executing the instructions cause the controllers to:
    enable an interrupt adjustment setting, wherein the one or more controllers do not increment an adjustment counter at every timing of printing a sheet in a case where the interrupt adjustment setting is not enabled, and the one or more controllers increment the adjustment counter at every timing of printing of the sheet in a case where the interrupt adjustment setting is enabled;
    cause the printer to form the gradation pattern image in a case where the adjustment counter has reached a predetermined value;
    generate gradation correction data, based on a result of the color measurement of the printed gradation pattern image by the measuring portion and a reference value; and
    perform gradation correction on image data by using the generated gradation correction data,
    wherein the formed gradation pattern image is determined in accordance with an image formation mode of the apparatus acquired when the printing of the predetermined number of pages has been performed, and
    wherein the one or more controllers cause the printer to print a color gradation pattern image by using chromatic recording materials when the acquired image formation mode is the color image formation mode, and the one or more controllers cause the printer to print a monochrome gradation pattern image by using the black single color recording material without using the chromatic color recording material when the acquired image formation mode is the monochrome image formation mode, the color gradation pattern image including a plurality of patch images with gradual variations in density.

2. The apparatus according to claim 1, wherein the printer is configured to form at least patch images each having one of a plurality of densities by using a first-color recording material and patch images each having one of the plurality of densities by using a second-color recording material different from the first-color recording material when the acquired image formation mode is the color image formation mode.

3. The apparatus according to claim 1, wherein the plurality of recording materials including the chromatic color recording material include at least two of a cyan toner, a yellow toner, a magenta toner, and a black toner.

4. The apparatus according to claim 1, wherein the one or more controllers set the predetermined number of pages via an operation portion of the apparatus.

5. The apparatus according to claim 1, wherein the gradation pattern image is formed on the sheet at an interval of one printing per the predetermined number of pages.

6. A method for an apparatus for switching between a color image formation mode in which printing is performed using a plurality of recording materials including a chromatic color recording material and a monochrome image formation mode in which printing is performed using a black single color recording material without using the chromatic color recording material, the method comprising:
    forming a gradation pattern image on a sheet fed from a sheet feeding stage in response to printing of a predetermined number of pages of images having been performed;
    reading the formed gradation pattern image and measuring a color of the gradation pattern image;
    enabling an interrupt adjustment setting;
    in a case where the interrupt adjustment setting is not enabled, not incrementing an adjustment counter at every timing of printing a sheet, and in a case where the interrupt adjustment setting is enabled, incrementing the adjustment counter at every timing of printing of the sheet in a case where the interrupt adjustment setting is enabled;
    forming the gradation pattern image in a case where the adjustment counter has reached a predetermined value;
    generating gradation correction data, based on a result of the color measurement of the printed gradation pattern image by measuring portion and a reference value; and
    performing gradation correction on image data by using the generated gradation correction data,
    wherein the formed gradation pattern image is determined in accordance with an image formation mode of the apparatus acquired when the printing of the predetermined number of pages has been performed, and
    printing a color gradation pattern image by using the chromatic recording material when the acquired image formation mode is the color image formation mode, and printing a monochrome gradation pattern image by using a black single color recording material without using the chromatic color recording material when the acquired image formation mode is the monochrome image formation mode, the color gradation pattern image including a plurality of patch images with gradual variations in density.

7. The method according to claim 6, wherein the forming forms at least patch images each having one of a plurality of densities by using a first-color recording material and patch images each having one of the plurality of densities by using a second-color recording material different from the first-color recording material when the acquired image formation mode is the color image formation mode.

8. The method according to claim 6, wherein the plurality of recording materials including the chromatic color recording material include at least two of a cyan toner, a yellow toner, a magenta toner, and a black toner.

9. The method according to claim 6, further comprising setting the predetermined number of pages.

10. The method according to claim 6, wherein the gradation pattern image is formed on the sheet at an interval of one printing per the predetermined number of pages.

11. A non-transitory recording medium that stores a program for causing a computer to execute a method for an apparatus for switching between a color image formation mode in which printing is performed using a plurality of recording materials including a chromatic color recording material and a monochrome image formation mode in which printing is performed using a black single color recording material without using the chromatic color recording material, the method comprising:

forming a gradation pattern image on a sheet fed from a sheet feeding stage in accordance with printing of a predetermined number of pages of images having been performed;

reading the formed gradation pattern image and measuring a color of the gradation pattern image;

enabling an interrupt adjustment setting;

in a case where the interrupt adjustment setting is not enabled, not incrementing an adjustment counter at every timing of printing a sheet, and in a case where the interrupt adjustment setting is enabled, incrementing the adjustment counter at every timing of printing of the sheet;

forming the gradation pattern image in a case where the adjustment counter has reached a predetermined value;

generating gradation correction data, based on a result of the color measurement of the printed gradation pattern image by the measuring portion and a reference value;

performing gradation correction on image data by using the generated gradation correction data, wherein the formed gradation pattern image is determined in accordance with an image formation mode of the apparatus acquired when the printing of the predetermined number of pages has been performed, and printing a color gradation pattern image by using the chromatic recording materials when the acquired image formation mode is the color image formation mode, and printing a monochrome gradation pattern image by using a black single color recording material without using the chromatic color recording material when the acquired image formation mode is the monochrome image formation mode, the color gradation pattern image including a plurality of patch images with gradual variations in density.

12. The non-transitory recording medium according to claim 11, wherein the forming forms at least patch images each having one of a plurality of densities by using a first-color recording material and patch images each having one of the plurality of densities by using a second-color recording material different from the first-color recording material when the acquired image formation mode is the color image formation mode.

13. The non-transitory recording medium according to claim 11, wherein the plurality of recording materials including the chromatic color recording material include at least two of a cyan toner, a yellow toner, a magenta toner, and a black toner.

14. The non-transitory recording medium according to claim 11, wherein the gradation pattern image is formed on the sheet at an interval of one printing per the predetermined number of pages.

* * * * *